US012129083B2

(12) United States Patent
Maggiolo et al.

(10) Patent No.: US 12,129,083 B2
(45) Date of Patent: Oct. 29, 2024

(54) FUEL CONTAINER ASSEMBLY

(71) Applicants: Eduardo Maggiolo, Coral Gables, FL (US); Robert H. Fernandez, Coral Gables, FL (US); Dominic Zunino, Coral Gables, FL (US); Pedro Perez Mas, Coral Gables, FL (US)

(72) Inventors: Eduardo Maggiolo, Coral Gables, FL (US); Robert H. Fernandez, Coral Gables, FL (US); Dominic Zunino, Coral Gables, FL (US); Pedro Perez Mas, Coral Gables, FL (US)

( * ) Notice: Subject to any disclaimer, the term of this patent is extended or adjusted under 35 U.S.C. 154(b) by 268 days.

(21) Appl. No.: 17/472,266

(22) Filed: Sep. 10, 2021

(65) Prior Publication Data

US 2022/0281653 A1 Sep. 8, 2022

Related U.S. Application Data

(60) Provisional application No. 63/156,562, filed on Mar. 4, 2021.

(51) Int. Cl.

| | |
|---|---|
| ***B65D 47/06*** | (2006.01) |
| ***B65D 21/02*** | (2006.01) |
| ***B65D 25/28*** | (2006.01) |
| ***B67D 3/00*** | (2006.01) |
| ***B67D 7/00*** | (2010.01) |

(Continued)

(52) U.S. Cl.
CPC ....... *B65D 47/061* (2013.01); *B65D 21/0212* (2013.01); *B65D 25/282* (2013.01); *B67D 3/0051* (2013.01); *B67D 3/0061* (2013.01); *B67D 7/005* (2013.01); *B67D 7/04* (2013.01); *B67D 7/3236* (2013.01)

(58) Field of Classification Search
CPC .. B65D 47/06; B65D 47/061; B65D 21/0212; B65D 25/282; B67D 3/0051; B67D 3/0061; B67D 7/005; B67D 7/04; B67D 7/3236
See application file for complete search history.

(56) References Cited

U.S. PATENT DOCUMENTS

| | | | | |
|---|---|---|---|---|
| 2,154,583 A * | 4/1939 | Rodgers | B67C 3/2637 | 141/294 |
| 3,540,402 A * | 11/1970 | Kocher | H01M 50/609 | 141/308 |
| 4,667,710 A | 5/1987 | Wu | | |

(Continued)

*Primary Examiner* — Nicolas A Arnett
(74) *Attorney, Agent, or Firm* — MALLOY & MALLOY, P.L.

(57) ABSTRACT

An assembly for stored containment of fuel including a high-strength, impact resistant container having a hermetically sealed, fuel containing chamber and a nozzle operatively connected in fluid communication with the chamber. The nozzle includes a conduit disposed in fluid communication with the chamber and a sleeve movable relative to the conduit, between an inward retracted position and an outwardly extended position. The conduit at least partially defines a liquid flow path out of the chamber and a gaseous flow path into the chamber is disposed between the conduit and the sleeve. A seal assembly is mounted on the sleeve and movable therewith relative to the conduit to define a first opening of the liquid flow path and a subsequent opening of the gaseous flow path, both into fluid communication with and between the chamber and an exterior of the nozzle.

18 Claims, 18 Drawing Sheets

(51) Int. Cl.
*B67D 7/04* (2010.01)
*B67D 7/32* (2010.01)

(56) References Cited

U.S. PATENT DOCUMENTS 4,834,151 A * 5/1989 Law .................... B67D 7/005 141/335
5,076,333 A * 12/1991 Law .................... B67D 3/046 141/335
5,159,523 A * 10/1992 Claassen ................... H05F 3/02 361/216
5,249,611 A * 10/1993 Law .................... B67D 3/046 141/335
5,400,928 A * 3/1995 Resnick ................. B65D 69/00 222/530
5,564,608 A * 10/1996 Cooper ................ B65D 25/385 220/203.27
5,924,608 A * 7/1999 Chiu .................... B65D 25/48 222/475
6,155,464 A * 12/2000 Vachon .................. B67D 7/005 222/481.5
6,397,902 B1 * 6/2002 Murphy ................. B67D 7/005 141/351
6,478,058 B1 * 11/2002 Pears .................... B67D 7/005 222/568
6,889,732 B2 * 5/2005 Allen .................... B67D 7/005 141/366
7,128,108 B2 * 10/2006 Nielsen .................. B67D 7/005 141/351
7,163,034 B2 * 1/2007 Franks ................. B67D 7/0205 222/383.2
7,621,304 B2 * 11/2009 Nielsen .................. B67D 7/005 141/351
8,567,646 B1 * 10/2013 Cray ...................... B67D 7/04 222/481.5
8,616,419 B2 * 12/2013 Slack ..................... B67D 7/005 222/536
8,668,120 B2 * 3/2014 Hall ....................... B65D 25/44 222/207
8,800,826 B2 * 8/2014 Forbis .................... B67D 7/005 222/484
8,950,637 B2 * 2/2015 Wilkins ................. B65D 25/44 222/530
9,783,404 B2 * 10/2017 Van Gelder ............ B65D 47/32
10,011,474 B2 * 7/2018 Bonner .............. B65D 21/0201
10,087,040 B2 * 10/2018 Morey ............... B65H 75/4434
10,280,065 B2 5/2019 Shaw
10,792,525 B2 * 10/2020 Cray ...................... A62C 3/065
2005/0083632 A1 * 4/2005 Hahn ................... B67D 7/0294 361/215
2011/0278324 A1 * 11/2011 Kilian ...................... B67D 7/04 222/145.5
2016/0167941 A1 * 6/2016 Bonner .................... B67D 7/38 285/302
2019/0144172 A1 * 5/2019 Vachon .................. B67D 7/005 222/481
2019/0316735 A1 * 10/2019 Zilberman ........ H01M 8/04208

* cited by examiner

FUEL CONTAINER ASSEMBLY

CLAIM OF PRIORITY

The present application claims priority under 35 U.S.C. Section 119 to a currently pending, U.S. Provisional application having Ser. No. 63/156,562 and filed on Mar. 4, 2021 which is incorporated by reference herein in its entirety.

BACKGROUND OF THE INVENTION

Field of the Invention

The present invention is directed to a fuel container assembly which includes predetermined safety features thereby enabling substantially prolonged storage and transportation within a vehicle. Refueling of the vehicle comprise a dispensing of fuel concurrent to a collection of vapors/gaseous fluid from the vehicle fuel tank.

Description of the Related Art

The transportation of fuel is extremely dangerous and it is an activity that can spell disaster in the event of a fuel container spill, improperly executed long-term storage, a vehicle crash, or human exposure to fuel fumes. These risks are primarily due to the fact that most types of fuel, such as gasoline, are highly flammable and emit dangerous fumes and are not retained by the conventional fuel containers because of the porosity of the plastic material from which many are formed.

To illustrate the risks of fuel transportation, even a low level of gasoline inside of a conventional fuel container has the potential to cause an explosion when it comes into contact with a spark or flame, as the vapor around the outside of conventional containers may cause a flashback inside the gas can if not properly protected. Additionally, gasoline fumes themselves can cause headaches, nausea, flu-like symptoms, or death in humans from exposure and conventional containers do not have adequate safety seal mechanisms to prevent fume escapement. Even used, empty conventional containers can pose such hazards, and storing such containers in the bed of a truck or in the trunk of a car, for example, will not mitigate these grave risks. However, despite the numerous risks, many people continue to use conventional fuel storage containers when transporting fuel that are made of inadequate materials for storage, have inadequate sealing, and/or are otherwise unsafe to transport inside of a vehicle.

In addition, the spillage of fuel, especially gasoline, while refueling is a frequent occurrence and source of irritation and damage both to the surrounding environment and to individuals. Also, an increasing problem is the effect on air quality, wherein spilled fuel quickly evaporates producing volumes of vapor several times larger than that of the spilled fuel itself. Therefore, the elimination of spilled fuel as well as the collection of vapor possibly arising from the container being refilled, is of significant importance. The significance of the problem is further evidenced by numerous states requiring that portable gasoline containers be un-vented and/or equipped with specifically structured spouts, spill proof containers/chambers and the ability to capture fuel vapor as it is displaced from the fuel tank being refilled.

Accordingly, in recent years the public in general and industrial entities in particular have become more concerned with the design structure and operative features of fuel storage and or transportation containers, especially involved with the use, storage of gasoline. Such regulations have or may be developed in the future requiring that portable containers directed to storage transport and use of gasoline be designed with certain safety features depending on their intended use of the container and the filling application or procedure intended. In addition, the Department of transportation (DOT) of the U.S. government may be equally concerned with safety relating to the transportation and storage of gasoline on public highways resulting in the proposal or institution of safety features such as, but not limited to, pressure test and/or drop test criteria for containers when filled. Additional requirements may further require that the joints, caps, etc. of portable fuel containers be protected from accidental damage when dropped, placed in a state of compression, stacked or subjected to vibration in accord with predetermined test parameters described by the governmental sponsored regulation.

In addition to protective safety features such as, but not limited to, the type set forth above a safe and effective container should also be structured to facilitate operative dispensing in a manner which avoids spillage, overfilling, vapor escape, etc.

Therefore, because storage of fuel in a proper container is of recognized importance when it comes to fuel transportation safety, there is a need for a safe fuel container assembly that can offset the risk of the hazards described above. Further, there is a need for a fuel container that safely stores combustible fuel such as, but not limited to, gasoline on a vehicle for potentially extended period of time, wherein the viability of the stored fuel is maintained concurrently to the elimination of odors escaping from the fuel container for an extended period of time. Such a proposed fuel container would enable the transport and storage of combustible fuel inside a passenger vehicle by incorporating safety features that eliminate or significantly restrict hazardous conditions.

SUMMARY OF THE INVENTION

The present invention is directed to a fuel container assembly structured to safely store fuel including, but not limited to, gasoline for a relatively prolonged period of time in a manner which does not provide danger to correspondingly disposed property or individuals. Moreover, the versatility of the fuel container assembly of the present invention facilitates the storage and transportation of fuel in various types motor vehicle thereby facilitating the at least partial refueling of the vehicle in conditions where the original fuel supply has been exhausted.

The structural and operative features of the fuel container assembly of the present invention emphasize its safe storage and dispensing due, at least in part, to the structural features of the various components of the fuel container assembly as well as the operative features associated with such components when the fuel is being dispensed into the tank of the vehicle or into other "fuel receiving receptacles". As set forth in greater detail hereinafter, safety features provided by utilization of the fuel supply assembly during prolonged storage and transportation include the elimination of vapors, odors, etc. escaping from the stored fuel into surrounding or adjacent areas including other areas of the vehicle.

The elimination of vapor/odor escape is accomplished, at least in part, by the structuring and assembling of a container component of the fuel container assembly, in a manner which hermetically seals an interior fuel containing chamber of the container, thereby eliminating the possibility of vapor or odor escape. Also, the fuel container assembly of the present invention is structured to eliminate or at least significantly restrict dangers from explosion or leakage of the contained fuel during an emergency event of the vehicle such as the occurrence of an accident, crash, collision, etc. Moreover, a substantially inert atmosphere is established and maintained within the chamber by adding an inert gas such as, but not limited to, nitrogen or argon, instead of air/oxygen, into the interior chamber. This serves to remove the gasoline or other fuel vapors out of the flammable range. This feature protects against the remote possibility of self-ignition by sudden gas compression, such as may occur because of deformation of the container in a crash, collision, etc. of the vehicle in which the container is stored.

As also described in greater detail hereinafter, the procedure of dispensing the stored fuel from the container into a vehicle or other fuel receiving receptacle is also rendered safer to the individual doing this dispensing as well as the environment in general. As such, the fuel container assembly, including a plurality of its operative components, is structured to efficiently dispense the fuel from the interior chamber of the container and concurrently collect vapor or other "gaseous fluid" from the interior of the fuel tank of the vehicle or fuel receiving receptacle, being replenished with fuel.

Accordingly, and as set forth above, the fuel container assembly of the present invention includes a container preferably, but not necessarily, having a cylindrical configuration and including a hollow interior defining a chamber in which fuel may be contained and stored for a substantially prolonged period. Also, the size of the chamber and the resulting dimensions of the interior chamber may vary dependent, at least in part, on the area of the vehicle or other location in which the container is stored and the quantity of fuel desired to be contained within the interior chamber. Further, the container is preferably formed from a high-strength, impact resistant material such as a high-strength metallic material including steel, stainless steel or other high strength material having electrical conductive properties or operative characteristics. As noted, the strength of the material from which the container is formed, in conjunction with the safety features, should be sufficient to minimize any adverse effect caused from an external agent, in case of vehicle emergencies including crash, collision etc. Therefore, the structural parameters of the container and the material from which it is formed should be such as to allow the container to withstand a six-foot, freefall impact test while filled with liquid.

Safety features regarding the prevention of escaping odors, vapors from the interior chamber are facilitated by the structuring and/or assembling of the container in a manner which facilitates the establishment of the chamber being "air tight" or hermetically sealed from the exterior thereof. Such hermetic sealing is also facilitated by structuring any type closure, such as associated with the access opening into the chamber, to include effective sealing structure which will maintain the hermetically sealed or air tight condition of the chamber until the closure of the access opening is removed. Such structuring or assembling of the container may include the welding of the metallic/high-strength material or the utilization of other manufacturing/assembling processes which effectively eliminates the possibility of vapor escape from the chamber through any types of seams, joints, junctions, etc.

Additional structural and operative features of the container include a handle, which in at least one embodiment is disposed on the lower, bottom or base end of the container. Such a handle is disposed and structured to facilitate the lifting and carrying of the container by an individual. In cooperation therewith, the opposite end or discharge end of the container may include a cover or closure, which is at least partially structured to accommodate an arrangement of two or more of the containers in a coaxially/vertically stacked array. In such an array, a portion of the cover removably connected to the discharge end will include a recess, groove or other preformed receiving structure, which is cooperatively dimensioned and configured with the aforementioned handle in the bottom or base into the container. As result, disposition and maintenance of a plurality of at least two of the containers in the aforementioned stacked array is facilitated by the handle being disposed and removably retained at least partially within the aforementioned recess, groove or receiving structure formed in the cover for the discharge end of the container.

Yet additional structural features of the container include the provision of a dry pocket mounted on the container within an interior of the chamber. The pocket includes an interior more specifically defined as a "dry interior" due to the fact that it is segregated from the liquid fuel retained within the interior chamber. The pocket and in particular the dry interior are cooperatively dimensioned and configured to removably receive and store a nozzle component of the fuel container assembly therein. As such, the efficiency and space-saving advantage of the cylindrical configuration of the container, in terms of being stored in an area of reduced volume, is maintained. This is based on the fact that the storage or mounting of the nozzle is within the interior chamber and not on an exterior portion of the container, where in the exterior of a typical or conventional portable container may have to be reshaped to be larger and/or bulky.

As indicated the fuel container assembly of the present invention includes a nozzle structured for operative connection to the container, wherein such operative connection may be defined as the nozzle disposed in fluid communication with the interior of the chamber, via a valve. As also indicated, the nozzle is structured for the concurrent dispensing of liquid fuel from the interior of the chamber into the vehicle or other fluid receiving receptacle, concurrently to the collection and passage of gaseous fluid from the fuel tank of the vehicle, etc. into the chamber. The aforementioned "gaseous fluid" may comprise vapor, air, and other gases exiting the fuel tank of the vehicle or fuel receiving receptacle, as the stored liquid fuel from the container is supplied thereto.

Therefore, the nozzle comprises first and second flow channels each operatively disposed in fluid communication with the chamber and successively disposed in open fluid communication between the chamber and an exterior of the nozzle, when the nozzle is operatively connected to the container. The first flow channel defines a path of liquid flow out of the chamber as the liquid gas is delivered to the fuel tank of the vehicle or other fuel delivering receptacle. The second flow channel defines a path of gaseous flow into the chamber, such as when the vapors, air, other gases, etc. pass from the fuel tank of the vehicle into the interior of the chamber.

In addition, the nozzle comprises a primary conduit at least partially defining the first flow channel as well as an outer sleeve. The outer sleeve is movable between an outwardly extended position and an inwardly retracted position, in which it is normally biased by a biasing structure. Moreover, the outer sleeve is movably disposed in surrounding, telescopic relation to a length of the primary conduit, wherein the second flow path is disposed within or at least partially defined by the space between the primary conduit and the outer sleeve. The cover is fixedly connected or mounted on the nozzle in surrounding telescopic relation to at least a portion of the outer sleeve, at least concurrent to the outer sleeve being in the inwardly retracted position. Further, movement of the sleeve into the aforementioned inwardly retracted position typically occurs as a nozzle component of the fuel container assembly enters the entrance or like structure of the fuel tank in which the liquid fuel is to be dispensed. The relative sizes between the entering portion of the nozzle and the size of the aperture or fill pipe of the vehicle, through which the dispensed fluid will flow is sufficiently difference to cause a forced movement of the sleeve into the inwardly retracted position.4

Further, the cover and the sleeve are cooperatively disposed and dimensioned to position the cover in interruptive, movement restricting engagement with the outer sleeve, concurrent to the sleeve being disposed in the inwardly retracted position. As set forth above, the biasing structure is disposed to normally bias the sleeve in the outer extended position and the cover is disposed in its overlying, protective relation to the biasing structure concurrent to the outer sleeve being in either or both the extended or retracted positions. Therefore, the biasing structure is protected from inadvertent contact with individuals using the fuel container assembly or variety of objects which may be disposed in or about the storage area of the fuel container assembly.

As described, the first and second flow channels are successively disposed in open fluid communication between the chamber and an exterior of the nozzle. Accordingly, the nozzle further includes a seal assembly mounted on the sleeve and movable therewith between the outwardly extended and inwardly retracted positions. The seal assembly preferably comprises a plurality of seal structures, is at least some of which are disposed in fluid sealing relation between the sleeve and an exterior of the primary conduit, at least when the sleeve is disposed in the outwardly extended position. In more specific terms, at least some of the plurality of seal structures are cooperatively disposed relative to the primary conduit to at least partially define a first opening of the liquid flow path/first flow path and a subsequent opening of the gaseous flow path/second flow path.

In order to further facilitate the successive opening of the first and second flow paths, the primary conduit or more specifically exterior portions thereof are dimensioned and configured to establish a non-sealing relation of some of the plurality of seal structures with the primary conduit, concurrent to the sleeve being in and/or approaching the inwardly retracted position. As a result, non-sealing relation of some of the plurality of seal structures with the exterior of the primary conduit will result in the opening of the first and second flow paths, albeit successively, between the interior of the chamber and the exterior of the nozzle, as stated. In order to accomplish such a non-sealing relation, cooperative structuring of the primary conduit with the seal structure comprises a plurality of release segments along the length of the primary conduit, each of which is dimensioned and configured to establish a non-sealing relation to at least a correspondingly positioned one of the seal structures. In more specific terms, at least one of the plurality of seal structures is movable with the sleeve into aligned, non-sealing relation to a first of the release segments of the primary conduit and thereby defines a disposition of the first flow channel in open fluid communication between the chamber and an exterior of the nozzle. In cooperation therewith and successively, at least one other of the plurality of seal structures is movable with the sleeve into aligned, non-sealing relation to a second one of the release segments, thereby defining a subsequent or successive disposition of the second flow channel in open fluid communication between the chamber and an exterior of the nozzle.

One or more embodiments of the fuel container assembly of the present invention also comprises a valve structure. The valve structure is disposed in interconnecting relation between the nozzle and the container and is selectively disposed between a closed orientation and an open orientation. In the open orientation the valve structure at least partially defines the operative connection of the nozzle to the container, in fluid communication with the interior chamber. More specifically, the valve structure comprises a first flow channel segment and a second flow channel segment. In the aforementioned open orientation, the first and second flow channel segments are concurrently disposed in aligned, interconnecting fluid communication between the chamber and the first and second flow channels within the nozzle. In contrast, in the closed orientation, first and second channel segments of the valve structure and closed and specifically disposed out of fluid communication with the interior of the chamber of the container.

Movement of the valve structure between the open and closed orientation preferably occurs, in at least one embodiment, by a rotational movement of the valve structure relative to the container. Such rotational movement may occur concurrent to the nozzle being attached to the valve structure, such that the nozzle and attached valve structure move together relative to the container, between the aforementioned open and closed orientations. Such preferred rotational movement of the valve structure relative to the container occurs through a predetermined angle of rotation which, due to cooperative structuring between the container interface and the valve structure defines the disposition thereof into an out of the open orientation. Such predetermined angle of rotation of the valve structure may be defined by substantially a one quarter turn. This facilitates the user being able to efficiently open and close the valve structure to establish the aforementioned fluid communication between the nozzle and the chamber. Moreover, a locking pin or other locking structure may be incorporated in the valve structure such that the valve structure is removably locked or maintained in both the open and closed orientations. Manipulation of the locking pin or other type locking structure may be easily accomplished by finger manipulation of the user.

As noted herein, the structural and operative features of the fuel container assembly of the present invention facilitate safe storage and transportation as well as the delivery of fuel to the fuel tank of a vehicle or other fuel receiving receptacle. Accordingly, one or more embodiments of the present invention include a static charge inhibitor assembly including a conductive cord disposable in electrically conductive attachment to and between the container and the vehicle or a fuel receiving receptacle. Also, a retractable reel serves to house the conductive cord such that the cord is movable on the retracted reel into an out of the housing of the retractable real and the conductive connection or attachment with the vehicle or fuel receiving receptacle. Moreover, in at least one embodiment a magnetic mount or attachment member is connected to an outer, distal end of the cord and is operative to magnetically connect the cord to the fuel receptacle, while the same time maintaining the electrically conductive connection. As a result of such electrical conductive connection between the vehicle and the container, electrical potential therebetween is substantially equalized, serving to eliminate or significantly restrict the possibility of a static charge developing.

As a result of the above-noted operative and structural features added safety is provided during storage, transportation and delivery of combustible fuel such as, but not limited to, gasoline. These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention will now be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

With initial reference to at least FIGS. 1-6, the present invention is directed to a fuel container assembly, generally indicated as 10, structured to safely store fuel 200 including, but not limited to, gasoline for a relatively prolonged period of time in a manner which does not provide danger to property or individuals. Moreover, the versatility of the fuel container assembly 10 of the present invention facilitates the storage and transportation of fuel 200 in various types of motor vehicle 100 thereby facilitating the at least partial refueling of the vehicle 100 such as when the original fuel supply has been exhausted.

The structural and operative features of the fuel container assembly 10 accomplish safe storage and dispensing due, at least in part, to the structural and operative features of the various components of the fuel container assembly 10. It is to be noted that one primary feature of the fuel container assembly 10 is the ability to prolong the storage of fuel and safely facilitate its transportation in a vehicle 100 until dispensing of the stored fuel is required or desired. Such safety features associated with the fuel supply assembly 10, during prolonged storage and transportation in a vehicle, include the elimination of vapors, odors, etc. escaping from the stored fuel into surrounding or adjacent areas.

For purposes of clarity, it is emphasized that the fuel container assembly 10 can be utilized to dispense fuel in a variety of practical applications other than to vehicles 100. Accordingly, the term "fuel receiving receptacle" is meant to include different types of motor vehicles, including passenger and commercial vehicles, as at 100, or different internal combustion (IC) motor powered devices, other than motor vehicles which may require the replenishment of fuel.

Figure 6A:
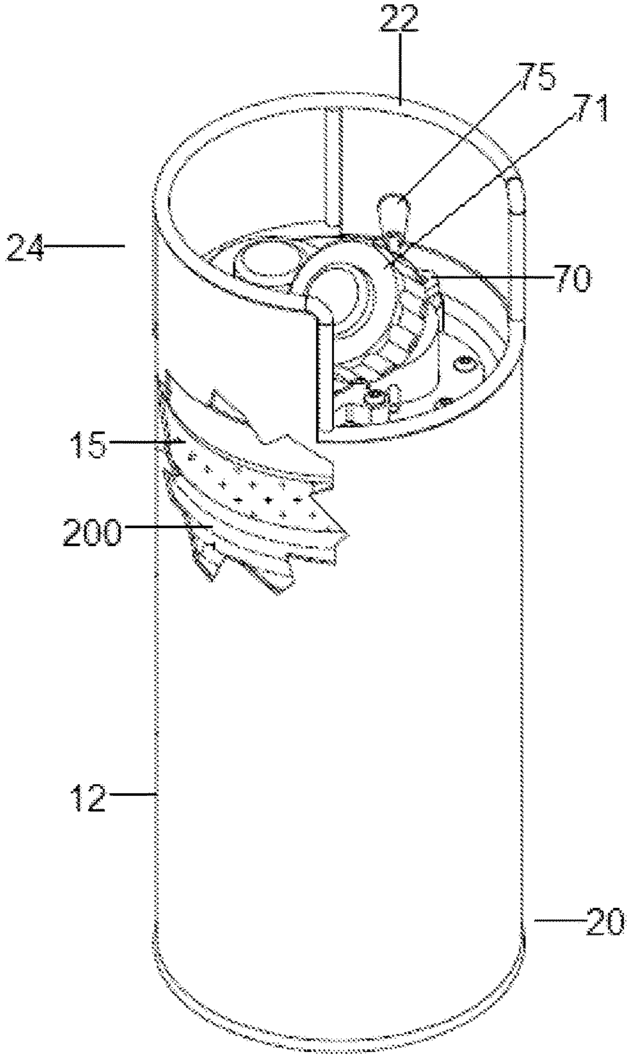
FIG. 6A is a front perspective view in partial cutaway of the embodiment of FIGS. 1-5 in assembled form with a valve structure.
Figure 6B:
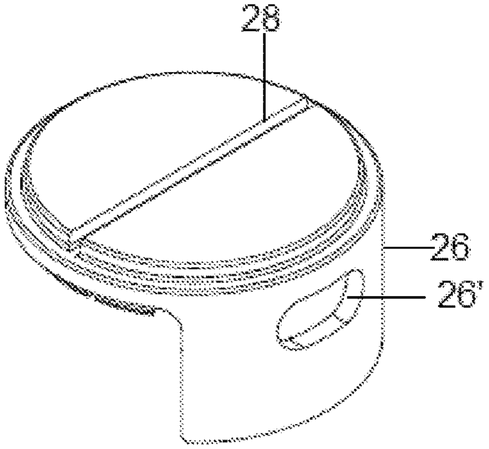
FIG. 6B is a perspective view of a cover for the discharge end of the container as represented in FIG. 6A.

The elimination of vapor/odor escape is accomplished, at least in part, by the structuring and assembling of a container 12 of the fuel container assembly 10, in a manner which hermetically seals an interior fuel containing chamber 14 of the container 12, thereby eliminating or significantly restricting the possibility of vapor or odor escape. Also, the fuel container assembly 10 of the present invention is structured to eliminate or at least significantly restrict dangers from explosion or leakage of the contained fuel 200, during an emergency event of the vehicle 100, such as the occurrence of an accident, crash, collision, etc. As also represented in FIG. 6A, a substantially inert atmosphere is established and maintained within the chamber 14 by adding an inert gas such as, but not limited to, nitrogen or argon, instead of air/oxygen, into interior of the chamber 14. This serves to reduce the gasoline or other fuel vapors out of the flammable range. Therefore, this feature protects against the remote possibility of self-ignition by sudden gas compression, such as may occur because of deformation of the container 12 in a crash, collision, etc. of the vehicle in which the container 10 is stored.

Figure 10:
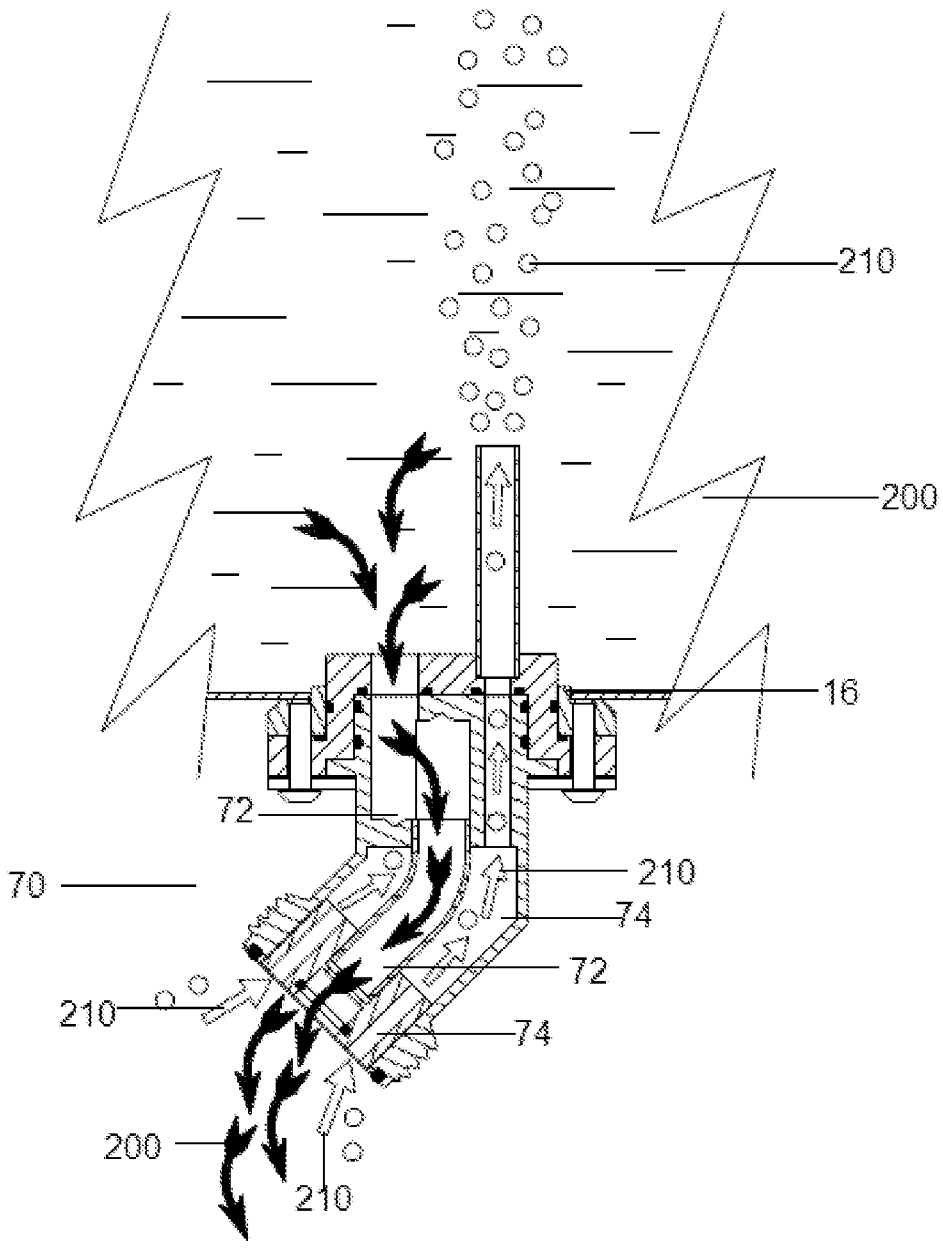
FIG. 10 is a sectional view in partial cutaway of the valve structure of FIGS. 9A-9E in operation and partially assembled form.

Further, the procedure of dispensing the stored fuel 200 from the container 12 into a vehicle or other fuel receiving receptacle 100 is also rendered safer to the individual doing the dispensing as well as the environment in general. As described in greater detail hereinafter with primary reference to at least FIGS. 8A-8D, 10 and 11A-11D, the fuel container assembly 10, including a plurality of its operative components, is structured to efficiently dispense the fuel 200 from the interior chamber 14 of the container 12 and concurrently collect vapor or other "gaseous fluid" from the interior of the fuel tank 102 of the vehicle or fuel receiving receptacle 100, being replenished with fuel. It is emphasized that for purposes of clarity and accuracy showing the proper sequence of liquid flow from the interior of the container and vapors or gaseous fluid into the container 12, FIGS. 8A-8D are schematic representations showing the nozzle 40 connected directly to the container 12, absent the valve 70. Similarly, FIG. 10 schematically represents liquid flow out through the valve 70 and vapor or gaseous fluid into and through the valve 70, wherein the nozzle 40 is not represented as being attached thereto. However, the correct and intended operative connection of the nozzle 40 to the container 12 is represented in FIGS. 11A-11D, wherein the nozzle 40 is interconnected to the container 12 in fluid communication with the interior chamber 14, via the valve 70.

Accordingly, and as set forth above, the fuel container assembly 10 includes the container 12 preferably, but not necessarily, having a cylindrical configuration and including a hollow interior defining a chamber 14 in which fuel 200 may be contained and stored for a substantially prolonged period. Also, the size of the container 12 and the resulting dimensions of the interior chamber 14 may vary dependent, at least in part, on the area of the vehicle or other location in which the container 12 is stored and the quantity of fuel 200 desired to be contained within the interior chamber 14. Further, the container 12 is preferably formed from a high-strength, impact resistant material such as a high-strength metallic material including steel, stainless steel, etc. As noted, the strength of the material from which the container 12 is formed should be sufficiently impact resistant to structurally survive without damage, in case of vehicle emergencies including crash, collision etc. Therefore, the structural parameters of the container 12 and the material from which it is formed should be such as to allow the container 12 to withstand a six-foot, freefall impact test, while filled with liquid.

As indicated, safety features regarding the prevention of escaping odors, vapors from the interior chamber 14 are facilitated by the structuring and/or assembling of the container 12 in a manner which facilitates the establishment of the chamber 14 being "air tight" or hermetically sealed from the exterior thereof. Such hermetic sealing is also facilitated by structuring any type closure, such as associated with an access opening 16 into the chamber 14, to include effective sealing structure which will maintain the hermetically sealed or air tight condition of the chamber 14 until the closure of the access opening 16 is removed. As you should also be apparent the hermetic sealing of the container is also negated when the chamber 14 is purposely exposed to ambient conditions, such as prior to dispensing the fuel 200 there from. The structuring or assembling of the container 12 to establish and maintain the airtight, hermetically sealed conditions, may include the welding of the metallic/high-strength material or the utilization of other manufacturing/assembling techniques which effectively eliminates the possibility of vapor escape from the chamber through any types of seams, joints, junctions, etc.

Figure 1:
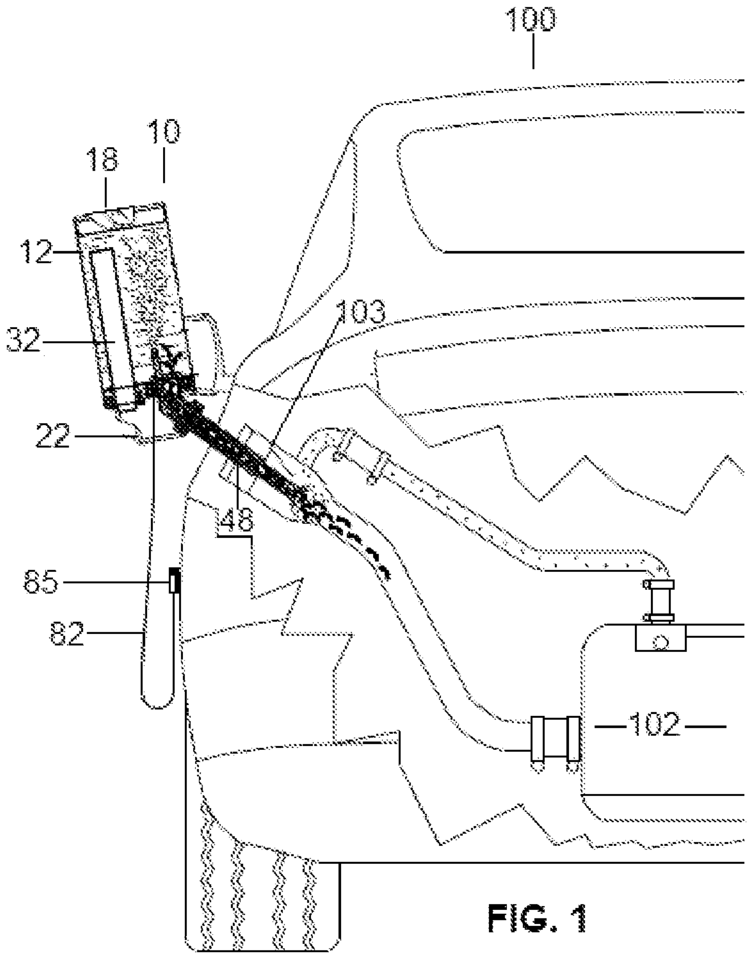
FIG. 1 is a perspective view of the fuel container assembly of the present invention in use.
Figure 2:
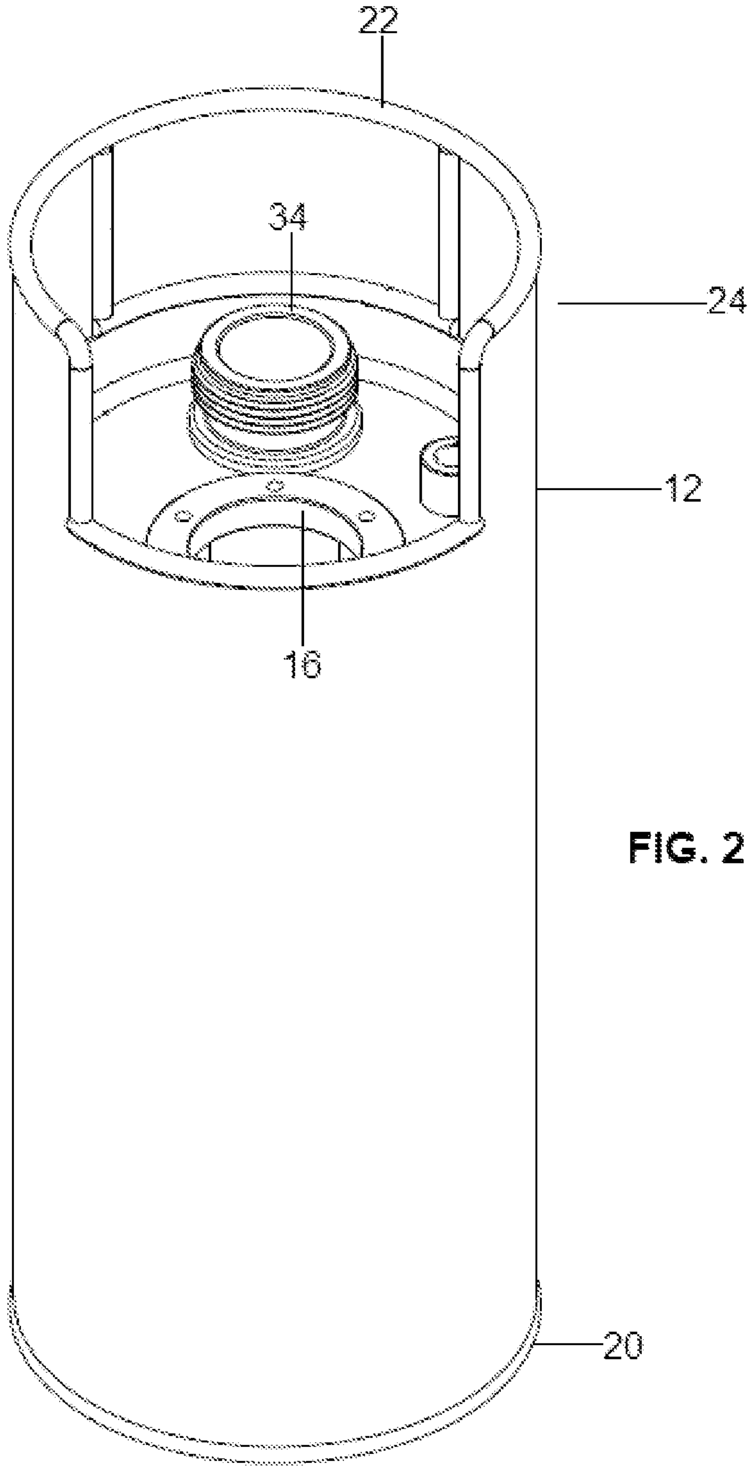
FIG. 2 is a's perspective view of a container of the fuel container assembly the present invention.
Figure 4:
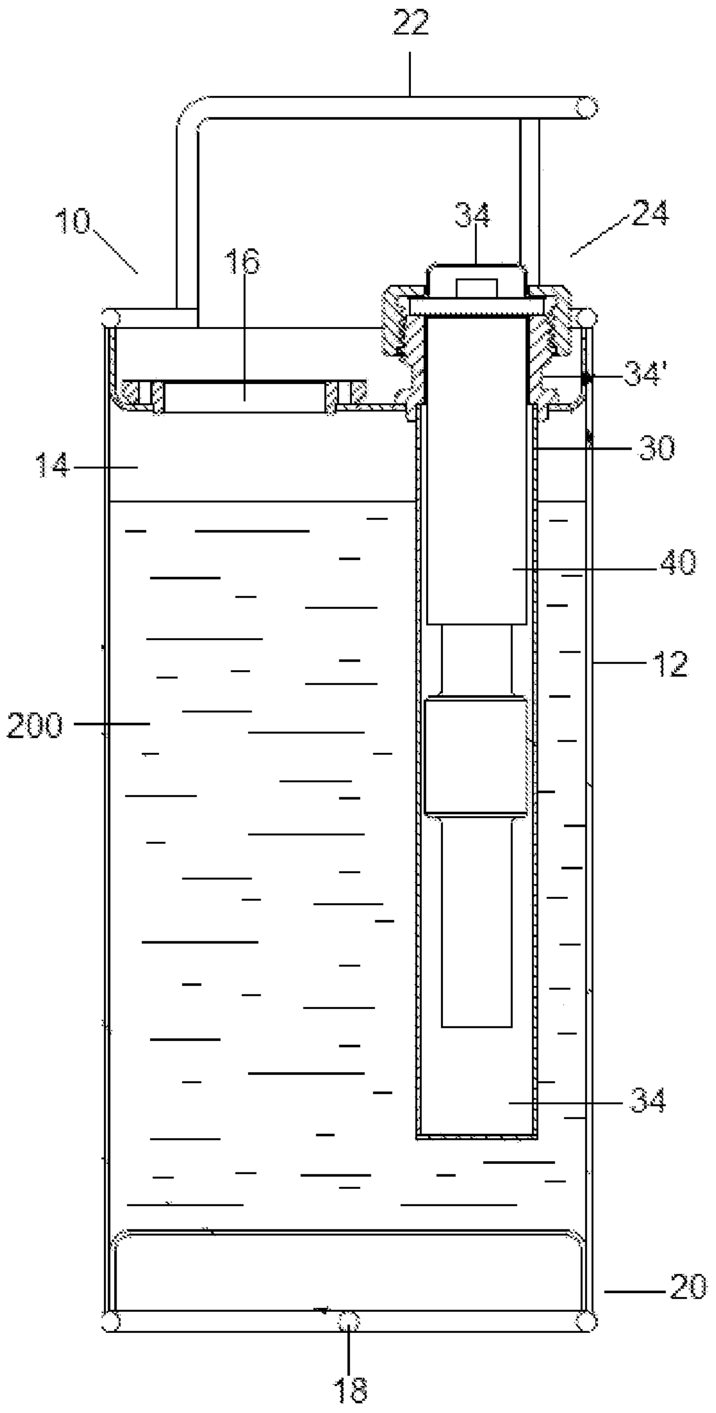
FIG. 4 is a longitudinal sectional view of the embodiment of FIGS. 3A and 3B in assembled form.
Figure 5:
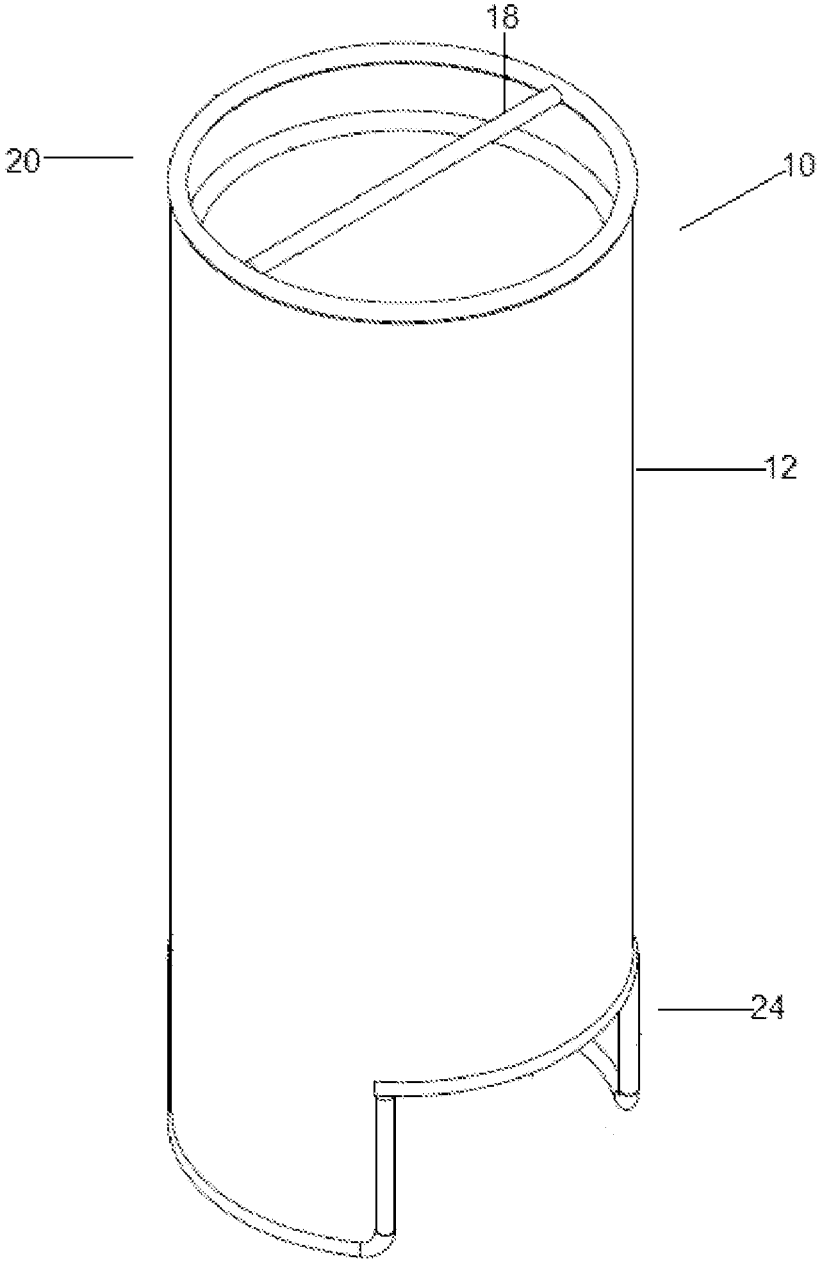
FIG. 5 is a bottom perspective view of the embodiment of FIG. 2.
Figure 7A:
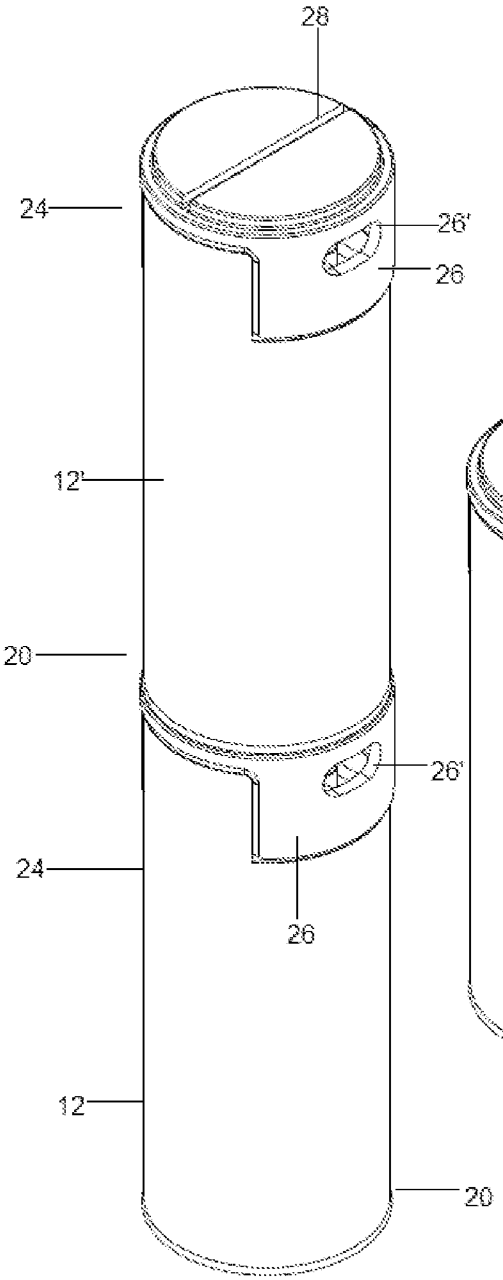
FIG. 7A is a perspective view of a plurality of fuel containers arranged in a co-axially oriented stacked array.
Figure 7B:
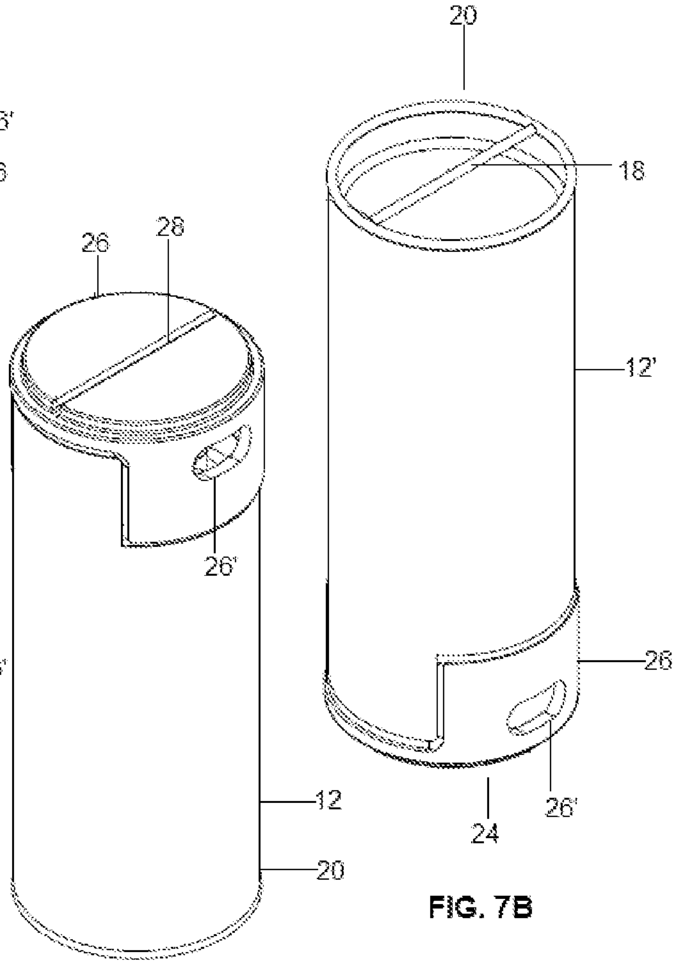
FIG. 7B is a perspective view of a plurality of fuel containers positioned to be positioned in the stacked array as represented in FIG. 7A.

Additional structural and operative features of the container include a handle 18 as represented in at least FIGS. 4, 5 and 7B. The handle 18 preferably includes an elongated rigid material rod or shaft, which in one embodiment is fixedly secured to the bottom or base end 20 of the container 12. In the represented disposition, the handle 18 facilitates the lifting and carrying of the container 12 by an individual in an at least partially inverted orientation. In cooperation therewith, a second or additional gripping structure or handle 22 is mounted on the top or "discharge end" 24 of the container 12. As represented, the additional or top and handle 22 is also formed from a rigid rod like structure having a curved configuration so as to be disposed in at least partially surrounding relation to the top end 24 of the container 12. As represented in FIG. 1, the handles 18 and 22 are cooperatively positioned to facilitate an individual positioning or manipulating the container 12 as the fuel 200 within the chamber 14 is dispensed into the vehicle or other fuel receiving receptacle 200.

In addition, the top, upper or discharge end 24 of the container 12 may include a cover or closure 26, dimensioned and configured to over lie and cover the valve structure 70 connected to the discharge end 24. Also, the cover or closure 26 may include an apertured grip 26', facilitating the mounting and removal of the cover 26. The cover 26 is also at least partially structured to accommodate an arrangement of two or more of the containers 12 and 12', as represented in FIG. 7A and 7B, in a coaxially/vertically stacked array. In such a stacked array, a portion of the cover 26, includes an exposed receiving structure 28 in the form of a recess, groove or other structure which is appropriately configured and dimensioned to at least partially correspond to the configuration and dimension of the handle 18. As result, disposition and maintenance of a plurality of at least two of the containers 12 and 12' in the aforementioned stacked array of FIG. 7A is facilitated by the handle 18 of container 12' being removably disposed at least partially within the receiving structure 28 formed in the cover 26 of the lower container 12, as represented in FIG. 7B. It is to be noted that the configuration and dimension of the handle 18 may vary from the elongated rod-like structure as represented. In cooperation therewith, the receiving structure 28 should be at least partially, correspondingly dimensioned and configured to facilitate the removable receipt of the handle 18 of another container therein.

Figure 3B:
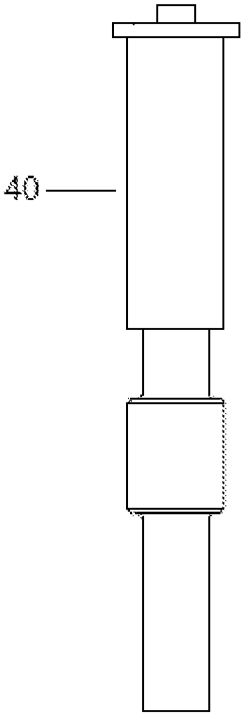
FIG. 3B is a schematic representation of a nozzle assembly associated with the fuel container assembly of the present invention.
Figure 3A:
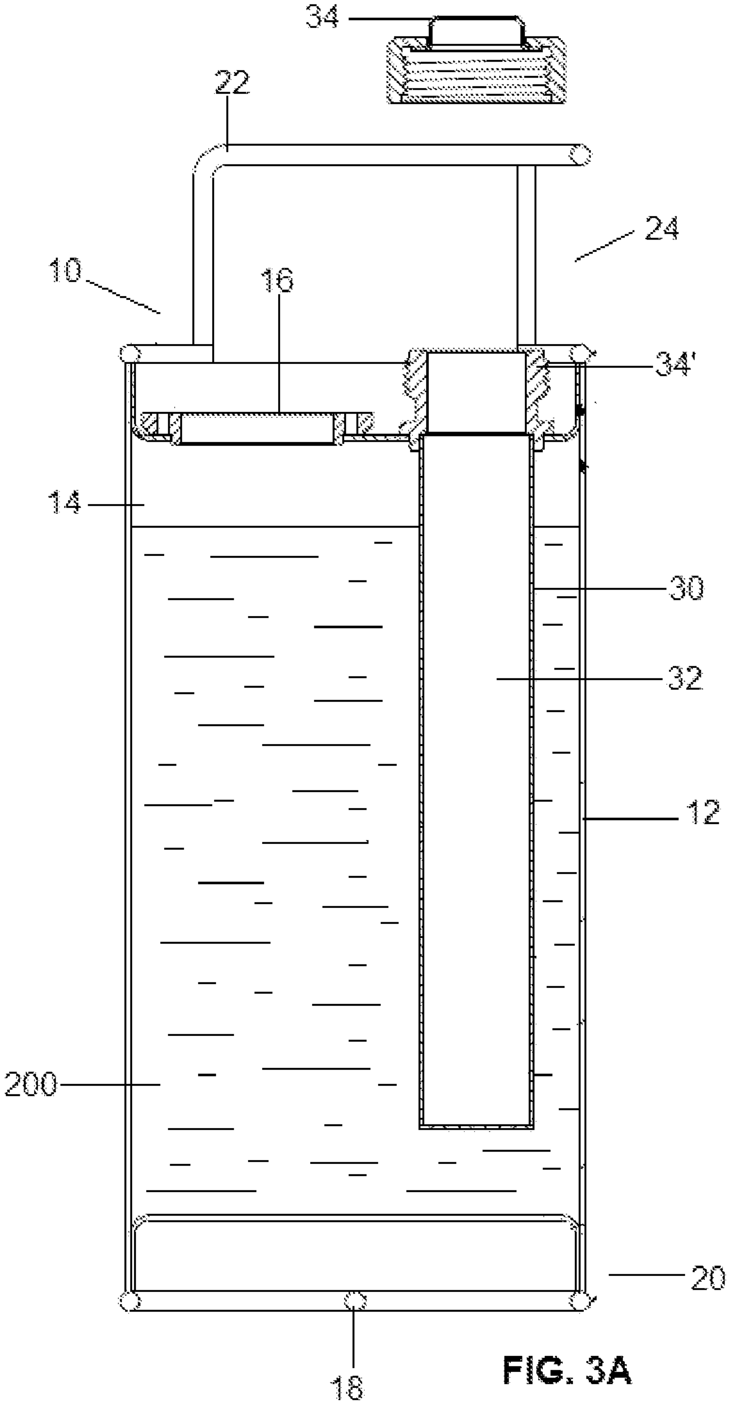
FIG. 3A is a longitudinal sectional view in schematic form of the embodiment of Figures 1 and 2.

As represented in FIGS. 3A, 3B, and 4, additional structural features of the container 12 include the provision of a "dry pocket" 30 mounted on the container 12 within an interior of the chamber 14. The pocket includes an interior more specifically defined as a "dry interior" 32 due to the fact that it is segregated from the liquid fuel 200 retained within the interior chamber 14. The pocket 30 and in particular the dry interior 32 are cooperatively dimensioned and configured to removably receive and store a nozzle component 40 of the fuel container assembly 10 therein, schematically represented in FIGS. 3B and 4. As such, the efficiency and space-saving advantage of the cylindrical configuration of the container 12, in terms of being stored in an area of reduced volume, is maintained. This is based on the fact that the storage or mounting of the nozzle 40 is within the interior chamber 14 and not on or within a storage area on its an exterior portion of a container, wherein the exterior of a typical or conventional portable container may have to be reshaped to be larger and/or bulkier. The preferred dry and protected condition of the nozzle 40 when disposed within the interior 32 is further facilitated by a closure 34 and/or locking or retaining structure 34'.

As indicated, the fuel container assembly 10 of the present invention includes a nozzle 40 structured for operative connection to the container 12, wherein such operative connection may be defined as the nozzle 40 interconnected to the container 12, via the valve 70, in a manner which disposes the nozzle 40 in fluid communication with the interior of the chamber 14, as represented in FIGS. 11A-11D. As also indicated, the nozzle 40 is structured for the concurrent dispensing of liquid fuel 200 from the interior of the chamber 14 into the vehicle or other fluid receiving receptacle 100, concurrently to the collection and passage of gaseous fluid 210 from the fuel tank 102 of the vehicle's 100 into the chamber 14. The aforementioned "gaseous fluid" 210 may comprise vapor, air, and other gases exiting the fuel tank 102 of the vehicle or fuel receiving receptacle 100, as the stored liquid fuel 200 from the container 12 is supplied thereto.

Therefore, the nozzle 40 comprises first and second flow channels 42 and 44 respectively, each operatively disposed in fluid communication with the chamber 14 and successively disposed in open fluid communication between the chamber 14 and an exterior of the nozzle 40 such as through the discharge end 41, when the nozzle 40 is operatively connected to the container 12. The first flow channel 42 defines a path of liquid flow out of the chamber 14 as the liquid fuel is delivered to the fuel tank 102 of the vehicle or other fuel delivering receptacle 100. The second flow channel 44 defines a path of gaseous flow into the chamber 14, such as when the vapors, air, other gases, etc. pass from the fuel tank 102 of the vehicle 100 into the interior of the chamber 14.

For purposes of clarity FIGS. 8A-8D are a schematic representation indicating both the structural and operative features of the nozzle 40 in specific relation to the opening and closing of the first and second flow channels 42 and 44. Somewhat similarly, FIG. 11A-11D indicate one embodiment of the fuel container assembly 10 of the present invention, wherein an intended operative connection is defined by the nozzle 40 and container 12 being interconnected to one another, via the valve structure 70, such that the nozzle 40 and valve 70 are or may be disposed in fluid communication with the interior chamber 14.

Accordingly, the nozzle 40 comprises a primary conduit 46, the interior of which at least partially defines the first flow channel 42. The nozzle 40 also comprises as an outer sleeve 48 which is telescopically movable between an outwardly extended position (see FIGS. 8A and 11A) and a fully inwardly retracted position (see FIGS. 8D and 11D). A biasing structure 50 is disposed on an interior portion of the nozzle 40 and serves to normally bias the outer sleeve 48 towards and into the fully extended position of FIGS. 8A and 11A. Moreover, the outer sleeve 48 is movably disposed in surrounding, telescopic relation to at least a portion of a length of the primary conduit 46, wherein the second flow path 44 is disposed within and at least partially defined by the space between the primary conduit 46 and the outer sleeve 48. In addition, a cover 52 is fixedly connected or mounted on the nozzle 40 in surrounding telescopic relation to at least a portion of the outer sleeve 48, at least concurrent to the outer sleeve 48 being in the inwardly retracted position. However, in at least one embodiment, the cover 52 is dimensions to extend over and in surrounding, protective relation to at least a portion of the outer sleeve 48 when it is disposed in both the outwardly extended position of FIGS. 8A and 11A and the fully, inwardly retracted position of FIGS. 8D and 11D.

It is also to be noted that movement of the sleeve 48 into the aforementioned inwardly retracted position typically occurs as a nozzle component of the fuel container assembly 10 enters the entrance or like structure of the fuel tank in which the liquid fuel is to be dispensed. The relatively larger size of the nozzle such as at 48' or other entering portion of the nozzle 40 than that of the aperture or fill pipe 103 of the vehicle 100, through which the dispensed fuel 200 will flow is sufficiently different to cause a forced movement of the sleeve 48 into the inwardly retracted position, as at least partially represented in FIG. 1.

Further, the cover 52 and the sleeve 48 are cooperatively disposed and dimensioned to position the cover 52 in interruptive, movement restricting engagement with the outer sleeve 48, concurrent to the sleeve 48 being disposed in the fully inwardly retracted position. More specifically, as represented in FIGS. 8A-D and 11A-D the outer sleeve 48 includes at least one portion 48' which has an increased outer transverse dimension by extending laterally or transversely outward beyond the outer surface or outer transverse dimension of the closure 52. As such, as represented in FIGS. 8D and 11D, inward retraction of the outer sleeve 48 will be limited due to the movement restricting engagement of the end portion 53 of the cover 52 with the outwardly extending portion 49 of the segment 48' of the outer sleeve 48. As set forth above, the biasing structure 50 is disposed to normally bias the sleeve 48 towards and into the fully outer extended position and the cover 52. In addition, the cover 52 is also disposed in overlying, protective relation to the biasing structure 50, concurrent to the outer sleeve 48 being in either or both the extended or retracted positions. Therefore, the biasing structure 50 is protected from inadvertent contact or interruptive engagement with individuals using the fuel container assembly 10 or variety of objects which may be disposed in or about the storage area of the fuel container assembly 10.

As described, the first and second flow and channels 42 and 44 are disposed separately and successively into open fluid communication between the chamber 14 and an exterior of the nozzle 40 via the discharge opening 41 of the outer sleeve 48. Such successive openings are facilitated by operation and disposition of a seal assembly generally indicated as 60, mounted on the outer sleeve 48 and movable therewith between the outwardly extended and inwardly retracted positions. As represented in both FIGS. 8A-8D and 11A-11D, the seal assembly 60 preferably comprises a plurality of seal structures, including at least seal structures 62, 63, 64, etc. Each or at least some of the seal structures 62-64 may be in the form of specifically structured, disposed and/or installed O-rings. However, other forms of seal structures may be utilized. Further, at least some seal structures, as at least 62 and 64 are disposed in fluid sealing relation between the sleeve 48 and an exterior of the primary conduit 46, at least when the sleeve 48 is disposed in the fully outwardly extended position. At least some of the plurality of seal structures, as at least 62 and 64, are cooperatively disposed relative to the outer surface of the primary conduit 46 to at least partially define the liquid flow path/first flow path 42 opening first and before a subsequent opening of the gaseous flow path/second flow path 44. The aforementioned sealing engagement of the sealing structures, at least 62 and 64, occurs by a compression of the respective seals into sealed engagement with the outer surface of the primary conduit 46 thereby restricting liquid or gaseous fluid flow thereby.

In order to further facilitate the successive opening of the first and second flow paths 42 and 44, the primary conduit 46 or more specifically exterior portions thereof define "release segments" as at 45 and 47. The release segments 45 and 47 are dimensioned, disposed and configured to disengage the outer surface of the primary conduit 46 from the seal structures, at least 62 and 64 thereby establishing a non-sealing relation with at least some of the plurality of seal structures. Such a non-sealing alignment between the release segments 45 and 47 and at least some of the seal structures 62 and 64 occurs upon movement of the outer sleeve 48 into and towards the fully inwardly retracted position of FIGS. 8D and 11D. As a result, non-sealing relation of some of the plurality of seal structures, including at least seal structures 62 and 64, with the exterior of the primary conduit 46 will result in the opening of the first and second flow paths 42 and 44, albeit separately and successively, thereby establishing fluid communication between the interior of the chamber 14 and the exterior of the nozzle 40 through or about discharge opening 41. Each of the plurality of release segments 45 and 47 include a recess, groove, channel or other structure demonstrating smaller or reduced exterior surface, transverse dimensions of the primary conduit 46.

Figure 8A:
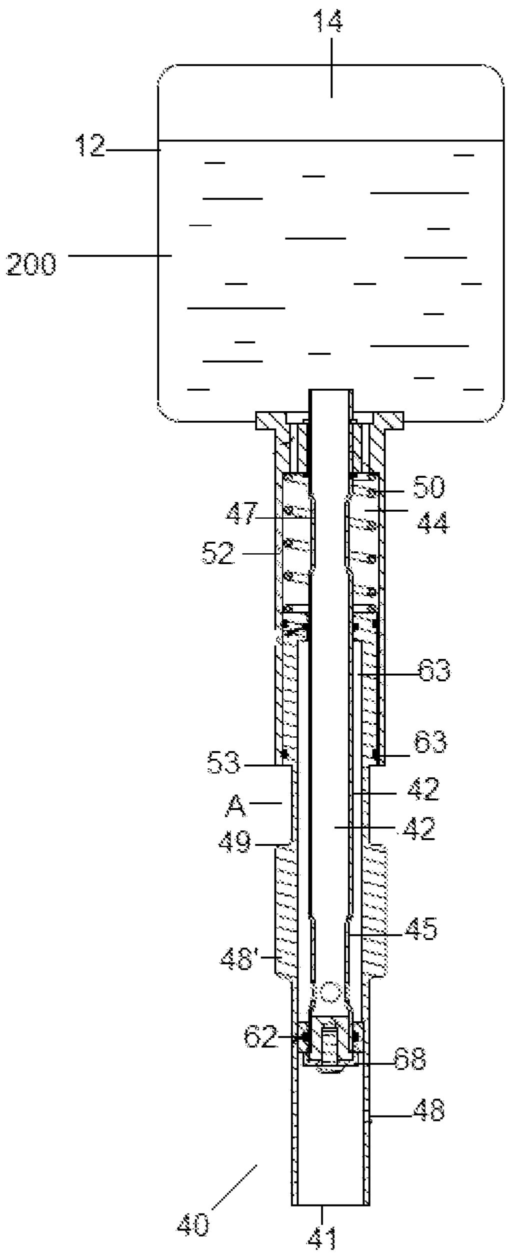
FIGS. 8A-8D are schematic representations representing successively performed operative features of one embodiment of the nozzle of the present invention.
Figure 8B:
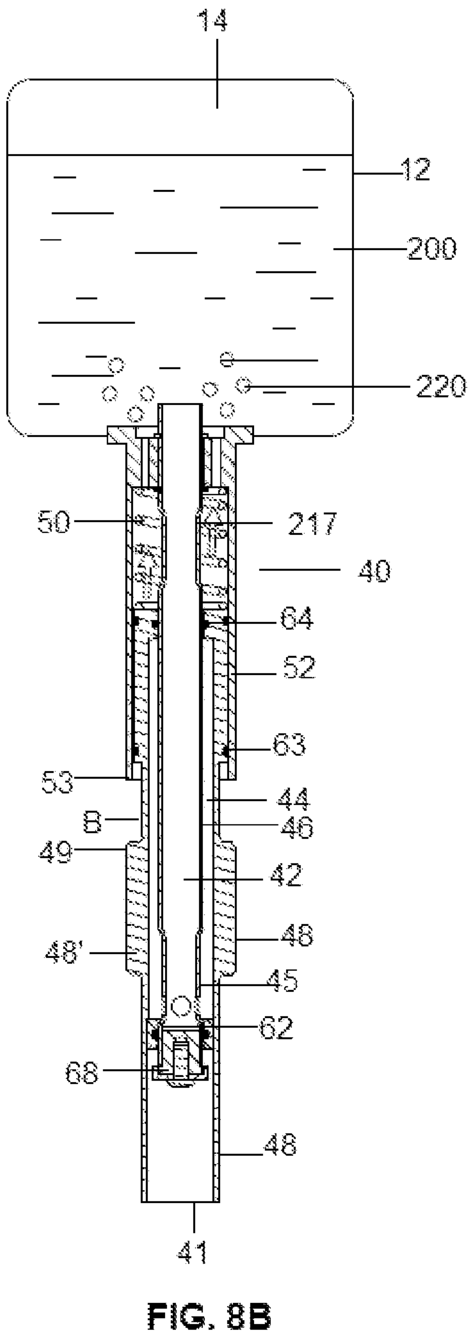
Figure 8C:
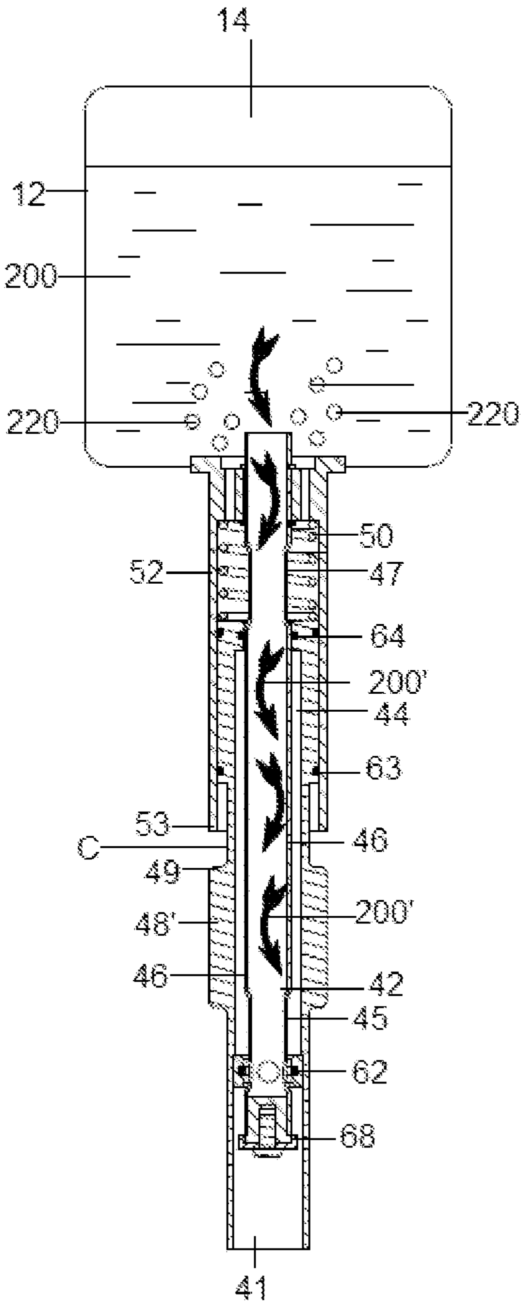
Figure 8D:
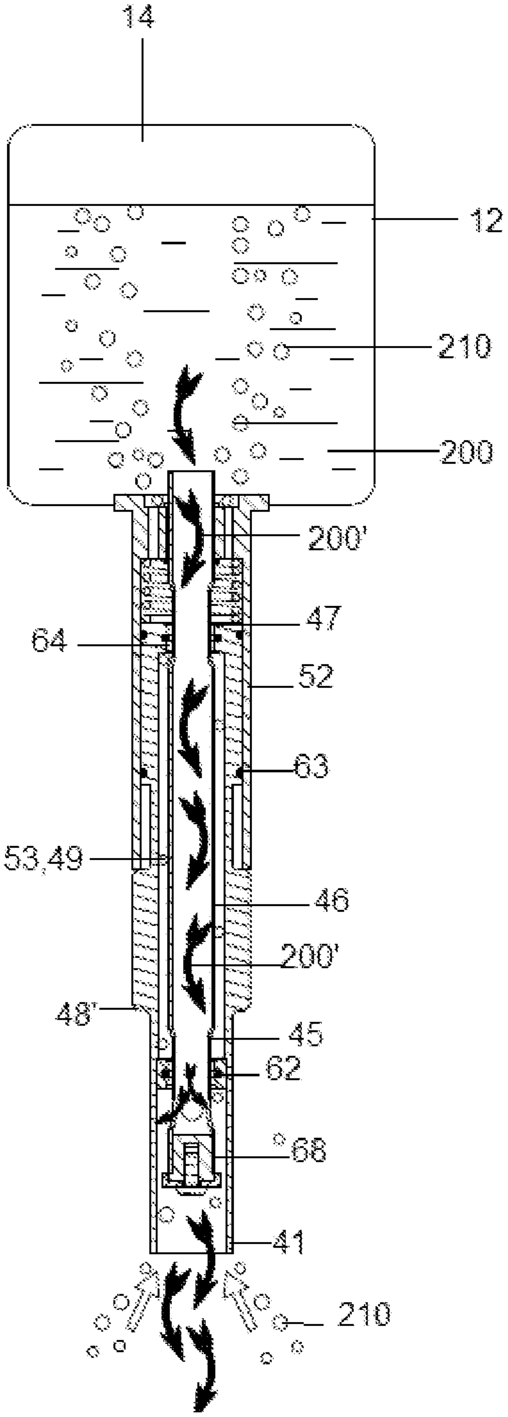
Figure 11A:
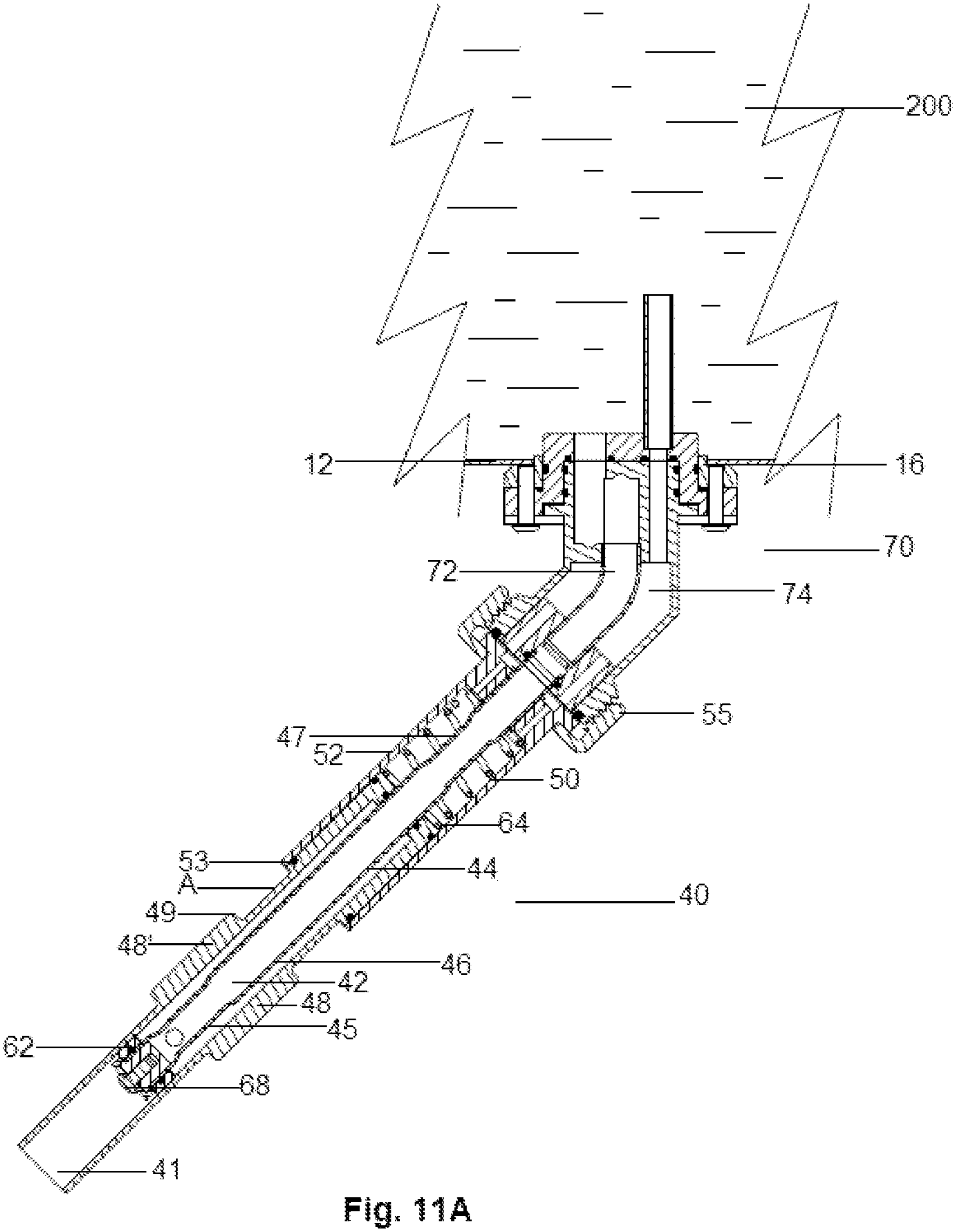
FIGS. 11A-11D are sectional views in schematic form representing successive steps of operation of the nozzle and valve structure defining an operative connection of the nozzle to the container via the valve structure.
Figure 11B:
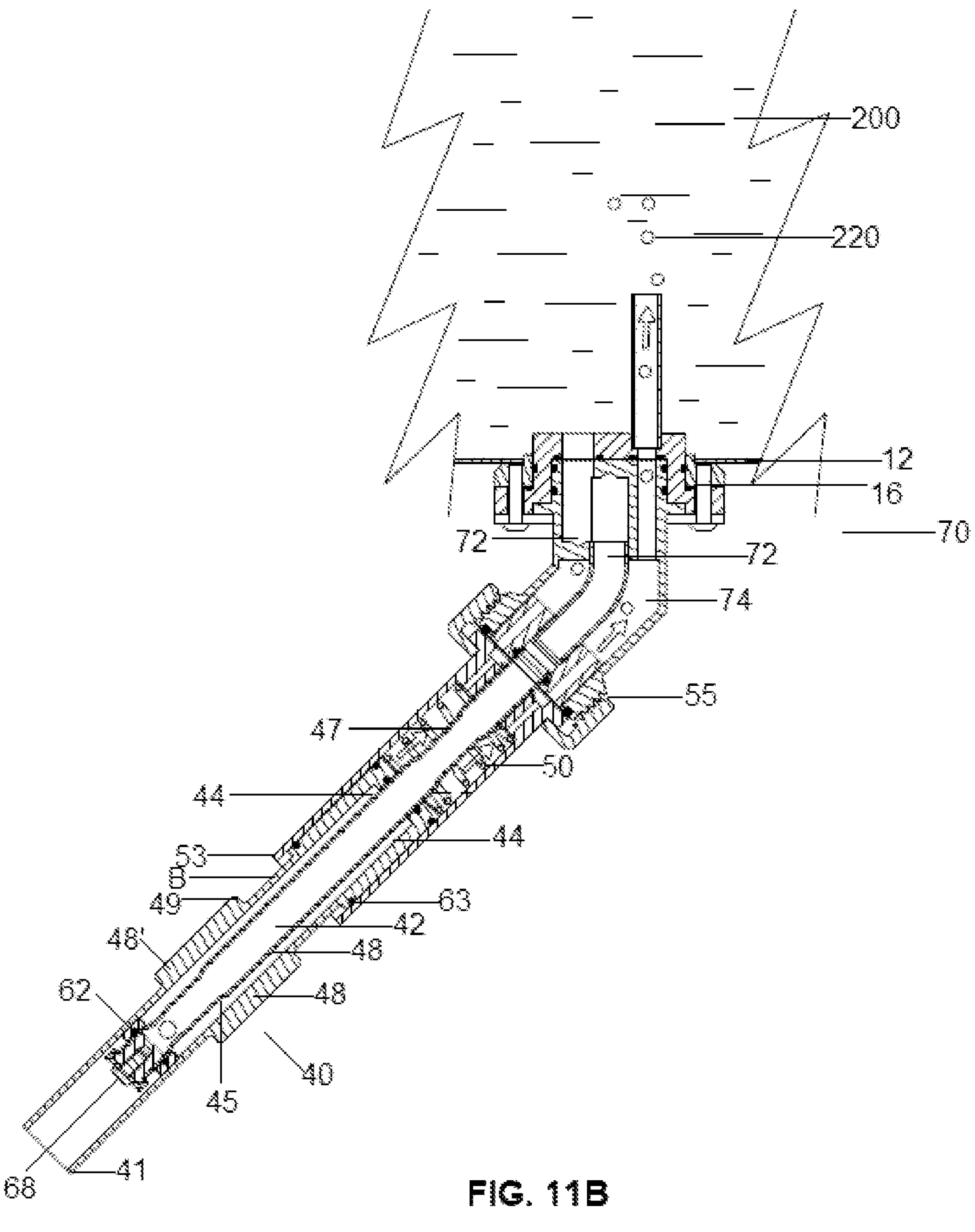
Figure 11C:
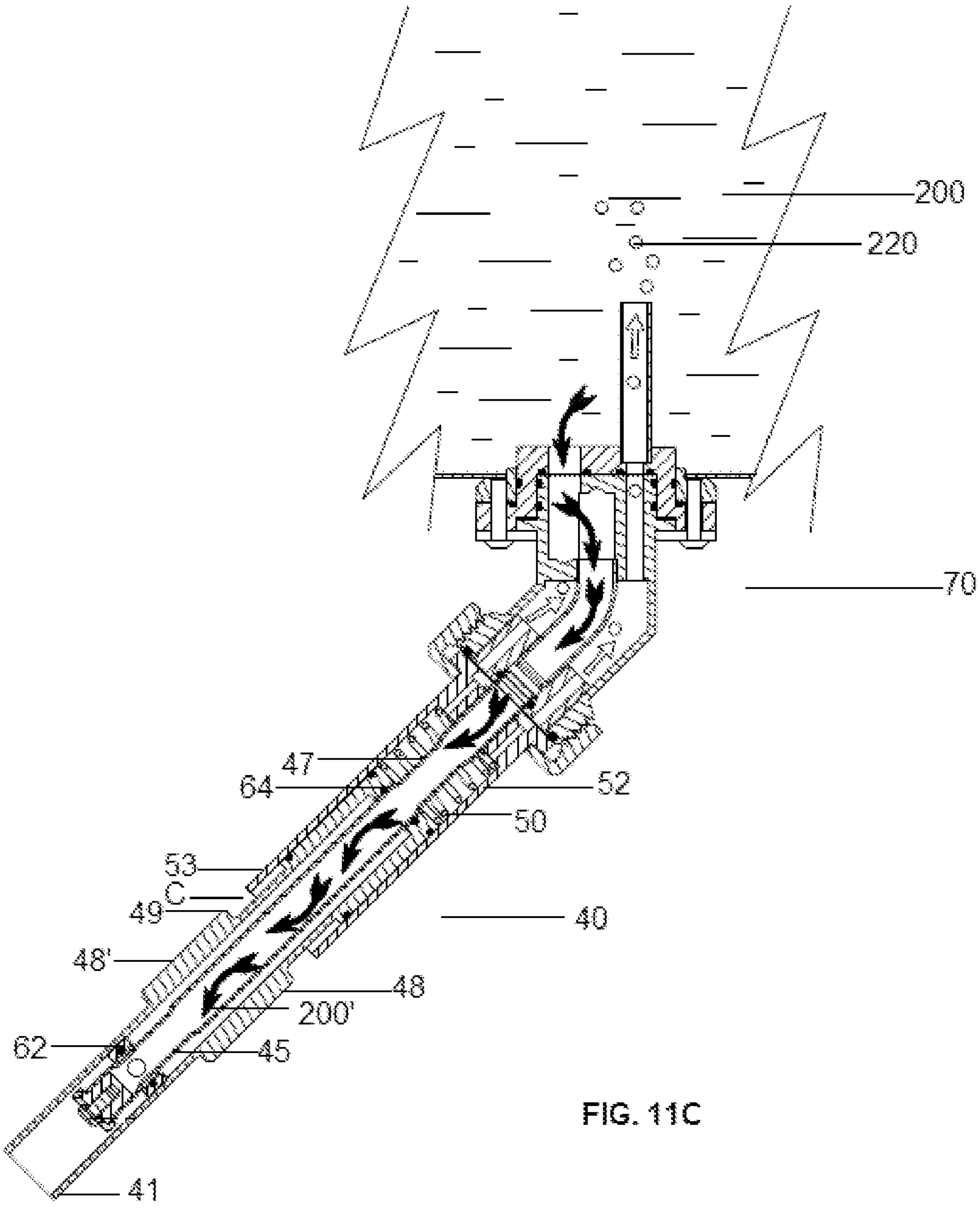
Figure 11D:
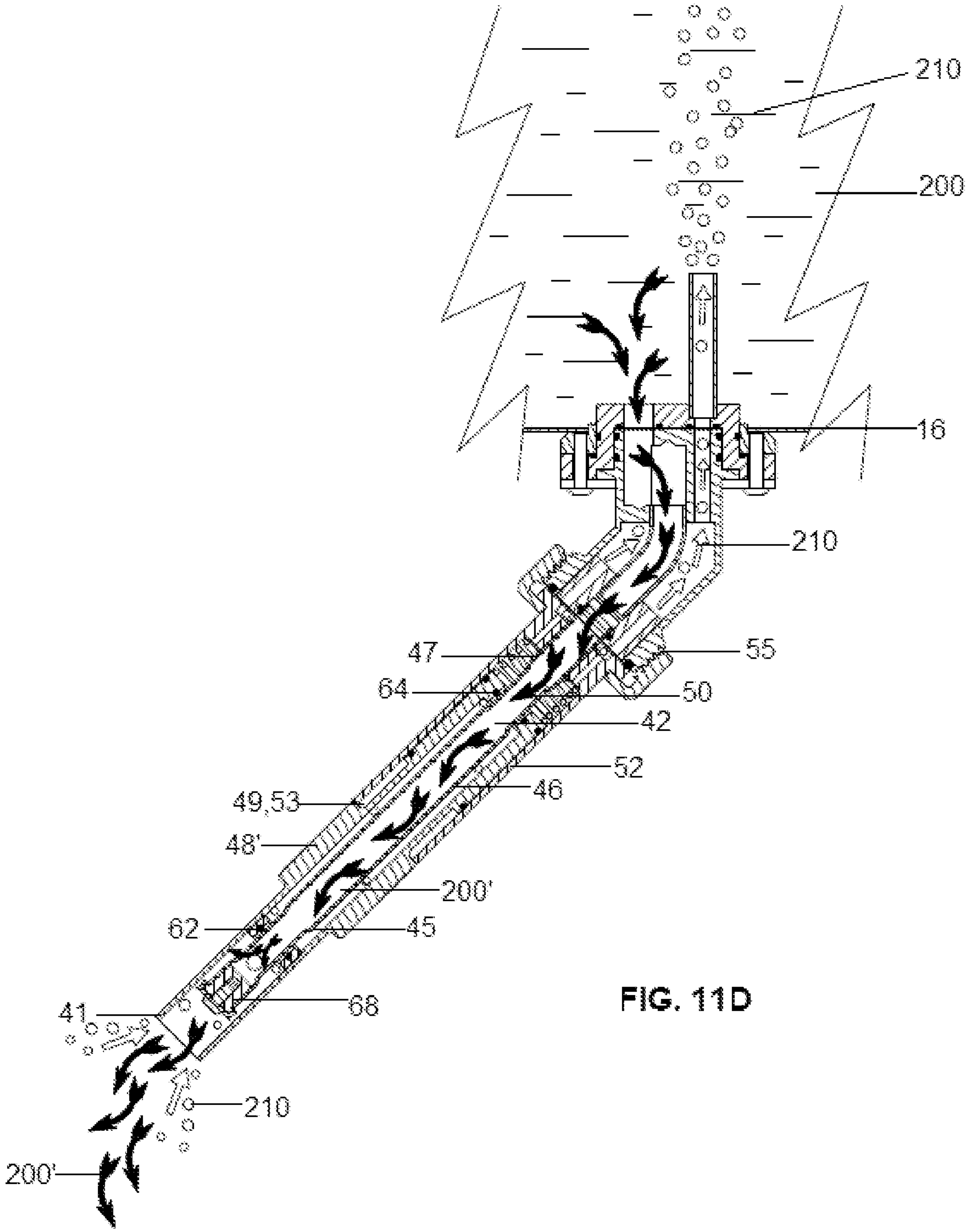

With reference to both FIGS. 8A-8D and 11A-11D, when the sleeve 48 is in its fully, outwardly extended position the distance or spacing "A" between the engaging points 49 and 53 on the sleeve 48 and the cover 52 is greatest. With reference to FIGS. 8B and 11B, as the sleeve begins to retract inwardly, the seal structures 62 and 64 also move inwardly along the length of the outer surface of the primary conduit 46 and eventually assume a spacing "B" between the engaging or contact points 49 and 53. However, both seal structures 62 and 64 remain in sealed engagement with the outer surface of the primary conduit 46, at this point of inward retraction. It is a further note that upon movement of the sleeve 48 into a position where the spacing has lessened, as at "B"', a pressure pulse 220 will be delivered to the interior chamber 14. The existence or delivery of the pressure pulse 220 is based at least in part on a reduction of the space coincident with the biasing structure 50 and a forcing of the air there from into the interior of the chamber 14.

Such a pressure pulse 220 will have the effect of at least minimally increasing the pressure within the chamber 14 thereby facilitating flow of liquid fuel 200 from the chamber 14 into and along the length of the nozzle 40 as evidenced by directional arrows 200' in FIGS. 8C-8D and 11C -11D, as the outer sleeve 48 continues to retract, resulting in a further reduction of the spacing to a size schematically represented as "C" between the engagement or contact points 49 and 53 and the beginning of liquid fuel flow into the first flow path 42 within interior of the primary conduit 46. However, at this point of inwardly directed retraction of the sleeve 48, at least one seal structure 62 is disposed in a, non-sealing relation with a first release segment 45, thereby serving to first open the first flow path/liquid flow path 42. However, at this point in the retraction (spacing "C") of the outer sleeve 48, at least one additional seal structure 64 remains in sealing engagement with the outer surface of the primary conduit 46, resulting in the second flow path/gaseous flow path 48 remaining closed.

Upon a fully retracted positioning of the outer sleeve 48 and the engagement of the contact points 49 and 51, as represented in FIGS. 8D and 11D, the seal structure 64 will be aligned with a second release segment 47 thereby establishing a non-sealing relation between the seal assembly 60 and the outer surface of the primary conduit 46. In turn, this will result in the second flow path 44 being opened, subsequent to the opening of the first flow path 42. Upon opening of the second flow path 44, the gaseous fluid 210 will enter the interior of the nozzle 40, between the inner surface of the sleeve 48 and the outer surface of the primary conduit 46, and pass into the interior of the chamber 14, as represented.

Due to the fact that at least one seal structure 62 is disposed dimensionally closer to the corresponding first release segment 45, a non-sealing engagement therebetween will occur first during the retraction of the sleeve 48, resulting in the opening of the first flow path 42. In contrast, the distance between at least one other of the seal structures, as at 64 and a second release segment 47 is farther than the distance between seal structure 62 and release segment 45. As a result, the non-sealing alignment therebetween seal structure 64 and the second release segment 47 will occur after or subsequent to the non-sealing alignment between the seal structure 62 and release segment 45. Accordingly, the first flow path 42 will be opened first and before the opening of the second flow path 44.

One or more embodiments of the fuel container assembly 10 of the present invention also comprises the aforementioned valve structure 70 represented in detail in FIGS. 9A-9E, 10 and in its assembled interconnecting position in FIGS. 11A-11D. For purposes of clarity, FIG. 10 represents the valve structure 70 attached to the container 12 but not connected to the nozzle 40. However, as used, the valve structure 70 is disposed in interconnecting relation between the nozzle 40 and the container 12 at threaded, sealed junction, or connection 55 and is selectively disposed between a closed orientation and an open orientation. In the open orientation, the valve structure 70 at least partially defines the operative connection and fluid communication of the nozzle 40 to the container 12, in fluid communication with the interior chamber 14. More specifically, as represented the valve structure 70 comprises a first flow channel segment 72 and a second flow channel segment 74. In the aforementioned open orientation, the first and second flow channel segments 72 and 74 are concurrently disposed in aligned, interconnecting fluid communication between the chamber 14 and the first and second flow channels 42 and 44 within the nozzle 40. In contrast, in the closed orientation, first and second channel segments 72 and 74 of the valve structure 70 are disposed out of fluid communication with interior of the nozzle 40 and the chamber 14.

Figure 9C:
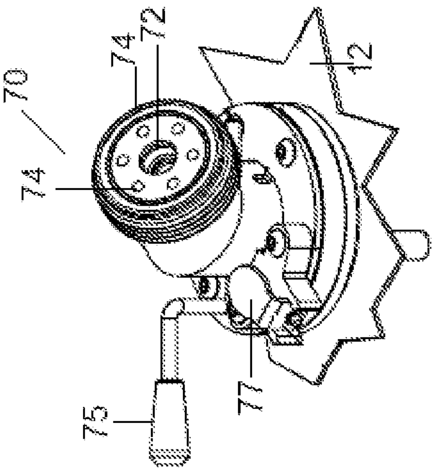
FIG. 9A-9E are perspective views in partial cutaway of a valve structure operatively associated with at least one embodiment of the fuel container structure of the present invention.
Figure 9B:
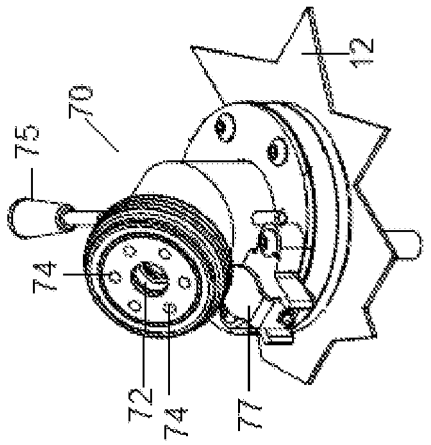
Figure 9A:
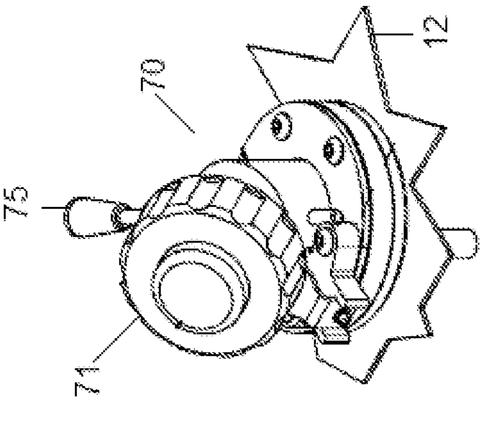
Figure 9E:
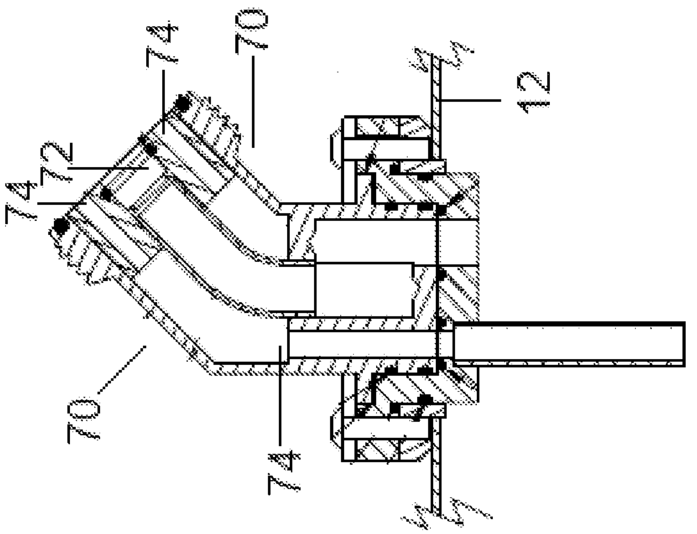
Figure 9D:
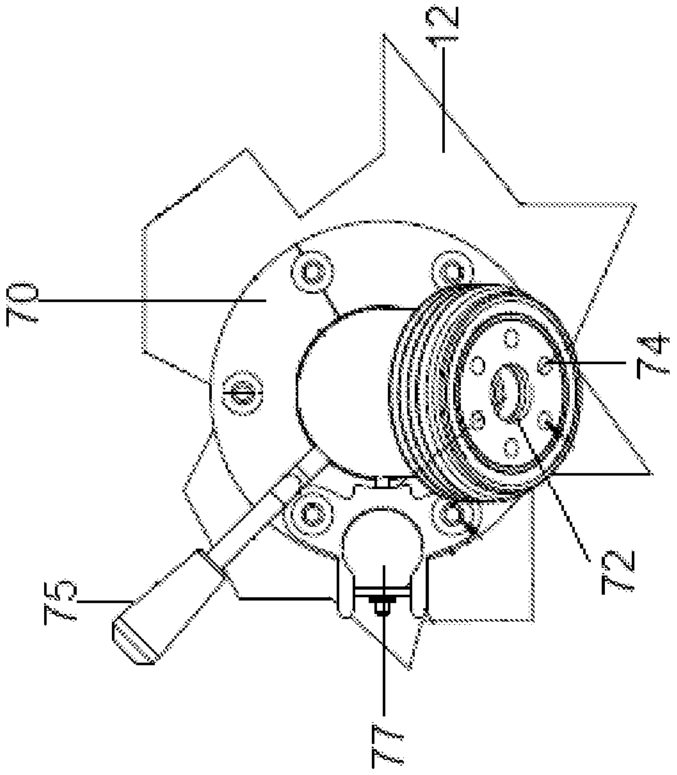

Movement of the valve structure 70 between the open and closed orientations preferably occurs, in at least one embodiment, by manipulation of a stem 75 resulting in a rotational movement of the valve structure 70 relative to the container 12. Such rotational movement may occur concurrent to the nozzle 40 being attached to the valve structure 70, such that the nozzle 40 and attached valve structure 70 move or rotate together relative to the container 12, between the aforementioned open and closed orientations. Such preferred rotational movement of the valve structure 70 relative to the container 12 occurs through a predetermined or preferred angle of rotation which, due to cooperative structuring between the container interface 73 and the valve structure 70 defines the disposition thereof into an out of the open orientation. Such predetermined angle of rotation of the valve structure 70 may be defined by substantially a one quarter turn or through an arc of approximately 90° . This facilitates the user being able to efficiently open and close the valve structure to establish the aforementioned fluid communication between the nozzle 40 and the chamber 14. Moreover, a locking pin or other locking structure 77 may be incorporated in the valve structure 70 such that it is removably locked or maintained in both the open and closed orientations. Manipulation of the locking pin or other type locking structure 77 may be easily accomplished by finger manipulation by the user. In addition, as represented in FIGS. 6A and 9A, prior to the attachment of the nozzle 40 to the valve structure 70, a closure cap 71 may be secured in sealing relation to the valve structure 70 so as to assure maintenance of the airtight or hermetically sealed condition of the chamber 14.

Figure 12:
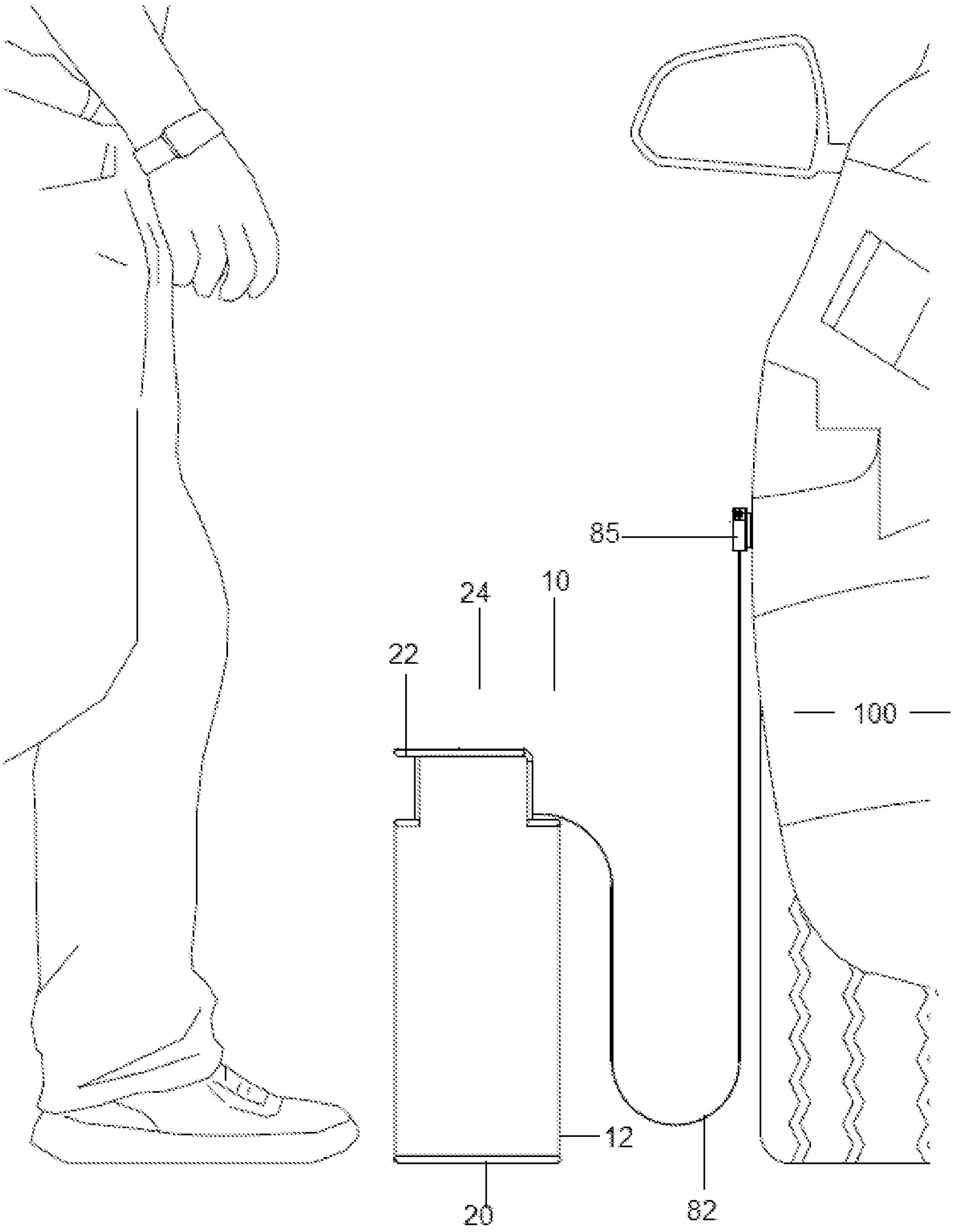
FIG. 12 is an elevation view in partial cutaway and schematic form representing utilization of the fuel container assembly of the present invention.
Figure 13A:
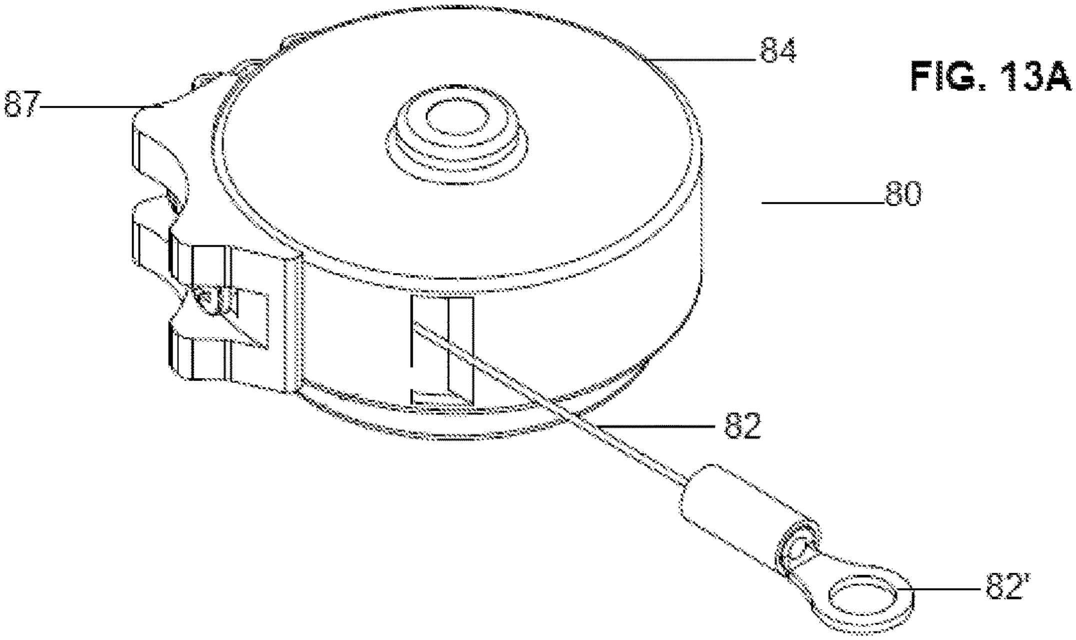
FIG. 13A is a top perspective view of a static charge inhibiting assembly utilized while refueling.
Figure 13B:
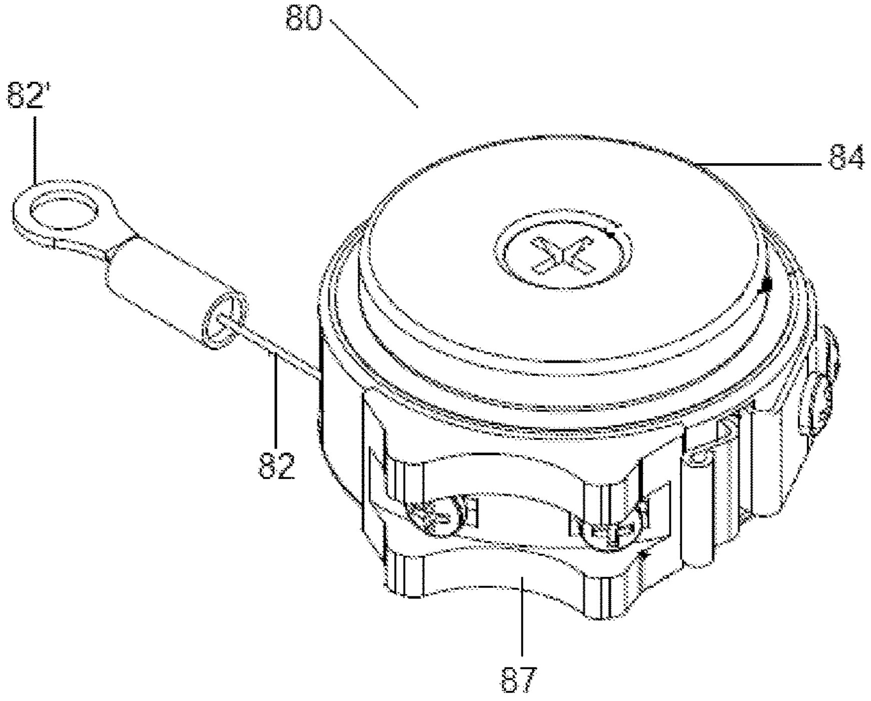
FIG. 13B is a bottom perspective view of the embodiment of FIG. 13A

As noted herein, the structural and operative features of the fuel container assembly 10 of the present invention facilitate safe storage and transportation as well as the delivery of fuel to the fuel tank 102 of a vehicle or other fuel receiving receptacle 100. Accordingly, one or more embodiments of the present invention include a static charge inhibitor assembly generally indicated as 80 in FIGS. 12 and 13A-13B. The static charge inhibitor assembly 80 comprises a conductive material cord 82 attachable in electrically conductive relation to and between the container 12 and the vehicle or a fuel receiving receptacle 100. More specifically, a magnetic mount 86 is secured to a distal extremity 82' and serves to magnetically attach the cord 82 to the vehicle 100. Also, a retractable reel 84 serves to house the conductive cord or cable 82, such that the cord 82 is movable on the retracted reel 84 into an out of the interior of the retractable real 84 and the magnetic, conductive mount 86 with the vehicle or fuel receiving receptacle 100. Moreover, in at least one embodiment a magnetic mount or attachment member 86 is secured in electrically conductive relation to an outer, distal end of the cord 82 and is operative to magnetically connect the cord 82 to the fuel receiving receptacle 100. At the same time, the retractable real 84 is secured directly to the metallic material container 12 by virtue of a connector 87. The connector 87 may also be formed of an electrically conductive, magnetic material and be magnetically or otherwise attached to the exterior of the container 12. Therefore, as operatively assembled and as represented in both FIGS. 1 and 12 there is a removable but sustainable electrical, conductive relation between the container 12 and the vehicle or fluid receiving receptacle 100. As a result of such a conductive connection between the vehicle 100 and the container 12, electrical potential therebetween is substantially equalized, serving to eliminate or significantly restrict the possibility of a static charge developing, during a dispensing of the liquid fuel 200.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly for stored containment of fuel, said assembly comprising:

a container including a chamber, structured for fuel containment, on the interior thereof, a nozzle structured for operative connection to said container in fluid communication with said chamber, said nozzle comprising first and second flow channels each operatively disposed in fluid communication with said chamber and successively disposed in open fluid communicating relation between said chamber and an exterior of said nozzle, concurrent to said operative connection of said nozzle, said first flow channel defining a path of liquid flow out of said chamber and said second flow channel defining a path of gaseous flow into said chamber, said nozzle comprising a primary conduit at least partially defining said first flow channel and an outer sleeve movable between an outwardly extended position and an inwardly retracted position; and said outer sleeve movably disposed in surrounding, telescopic relation to a length of said primary conduit and said second flow channel disposed between said primary conduit and said outer sleeve, a seal assembly mounted on said outer sleeve and movable therewith between said outwardly extended and inwardly retracted positions; said seal assembly comprising a plurality of seal structures disposed in fluid sealing relation between said outer sleeve and an exterior of said primary conduit, at least concurrent to said outwardly extended position, and an exterior of said primary conduit comprising a plurality of release segments, each dimensioned and configured to establish a non-sealing relation to correspondingly positioned ones of said plurality of seal structures, one of said plurality of seal structures movable with said outer sleeve into aligned, non-sealing relation to a first of said plurality of release segments to define a disposition of said first flow channel in open fluid communication between said chamber and an exterior of said nozzle.

2. The assembly as recited in claim 1 further comprising a cover fixedly connected to said nozzle in surrounding telescopic relation to at least a portion of said outer sleeve, at least concurrent to said retracted position.

3. The assembly as recited in claim 2 wherein said cover is disposed in interruptive, movement restricting engagement with said outer sleeve, concurrent to said inwardly retracted position.

4. The assembly as recited in claim 2 wherein said nozzle comprises a biasing structure disposed to normally bias said outer sleeve in said outer extended position; said cover fixedly disposed in overlying, protective relation to said biasing structure, concurrent to said outwardly extended and inwardly retracted positions of said outer sleeve.

5. The assembly as recited in claim 1 further comprising a pocket mounted on said container within said chamber and including a dry interior disposed in segregated relation to fluid within said chamber; said dry interior cooperatively dimensioned and configured with said nozzle for retained storage thereof.

6. An assembly as recited in claim 1 wherein said chamber includes a liquid fuel and an inert gas collectively retained within a substantial entirety of said chamber.

7. An assembly as recited in claim 1 wherein said container is structured to define said chamber being hermetically sealed, relative to an exterior of said container, at least prior to said operative connection of said nozzle.

8. An assembly as recited in claim 1 wherein said plurality of seal structures are cooperatively disposed relative, to said primary conduit, to at least partially define said successive disposition of said first and second flow channels in said open fluid communication between said chamber and an exterior of said nozzle.

9. An assembly as recited in claim 8 wherein an exterior of said primary conduit is dimensioned and configured to establish a non-sealing relation of said plurality of seal structures with said primary conduit, concurrent to said outer sleeve being in said inwardly retracted position.

10. An assembly as recited in claim 1 wherein one other of said plurality of seal structures movable with said outer sleeve into aligned, non-sealing relation to a second of said release segments to define a disposition of said second flow channel in open fluid communication between said chamber and an exterior of said nozzle.

11. An assembly as recited in claim 10 wherein said one other seal structure is disposed relative to said second release segment to establish said disposition of said second flow channel in said open fluid communication between said chamber and said exterior said nozzle, subsequent to said disposition of first flow channel in said open fluid communication between said chamber and an exterior of said nozzle.

12. An assembly as recited in claim 1 further comprising a valve structure disposed in interconnecting relation between said nozzle and said container, said valve structure selectively disposed between a closed orientation and an open orientation; said open orientation at least partially defining said operative connection of said nozzle to said container, in fluid communication with said chamber.

13. An assembly as recited in claim 12 wherein said valve structure comprises a first flow channel segment and a second flow channel segment; said open orientation comprising said first and second flow channel segments concurrently disposed in aligned, interconnecting fluid communication between said chamber and said first and second flow channels within said nozzle.

14. An assembly as recited in claim 13 wherein said valve structure is rotationally connected to said container concurrent to attachment thereof to said nozzle; said valve structure movable relative to said container between a predetermined angle of rotation to define disposition thereof into an out of said open orientation.

15. An assembly as recited in claim 1 further comprising a handle mounted on one end of said container and a cover disposed on an opposite end of said container; said cover of one container configured to removably receive said handle of one other of said containers therein, concurrent to an axially stacked array of at said one container and said one other container.

16. An assembly as recited in claim 1 further comprising a static charge inhibitor assembly including a conductive cord disposable in conductive connection between said container and a fuel receiving receptacle; a retractable reel housing said conductive cord; said cord movable on said retractable reel into an out of said conductive connection with the fuel receiving receptacle.

17. An assembly as recited in claim 16 further comprising a magnetic mount member connected to said cord and operative to magnetically connect said cord to said fuel receptacle.

18. An assembly for stored containment of fuel, said assembly comprising:

a container including a hollow interior defining a chamber for fuel containment, said container formed of a high-strength metallic material assembled to define a hermetic sealing of said chamber, a nozzle operably connected to said container in fluid communication with said chamber, said nozzle comprising a primary conduit disposed in fluid communication with said chamber and an outer sleeve movable relative to said primary conduit between an inwardly retracted position and an outwardly extended position; said outer sleeve disposed in telescopically surrounding relation to said primary conduit, said primary conduit at least partially defining a liquid flow path out of said chamber; a gaseous flow path into said chamber disposed between said primary conduit and said outer sleeve, a seal assembly mounted on said outer sleeve and movable therewith, between said inward retracted position and said outwardly extended position, said seal assembly comprising a plurality of seal structures cooperatively disposed relative to said primary conduit to define a first opening of said liquid flow path and the subsequent opening of said gaseous flow path in fluid communication with and between said chamber and an exterior of said nozzle, and an exterior of said primary conduit comprising a plurality of release segments, each dimensioned and configured to establish a non-sealing relation to correspondingly positioned ones of said plurality of seal structures, one of said plurality of seal structures movable with said outer sleeve into aligned, non-sealing relation to a first of said plurality of release segments to define a disposition of said first flow channel in open fluid communication between said chamber and an exterior of said nozzle.

* * * * *